United States Patent [19]

Chiashi et al.

[11] Patent Number: 5,708,781
[45] Date of Patent: Jan. 13, 1998

[54] APPARATUS AND METHOD FOR DIVIDEDLY TRANSMITTING AND RECEIVING MESSAGE DATA USING CONNECTION CODES APPENDED AS PART OF THE TRANSMISSION PACKETS DATA FIELD

[75] Inventors: Eiji Chiashi, Hamura; Kazuhiro Shimura, Higashiyamato, both of Japan

[73] Assignee: Casio Computer Co., Ltd., Tokyo, Japan

[21] Appl. No.: 363,758

[22] Filed: Dec. 23, 1994

[30] Foreign Application Priority Data

Dec. 29, 1993 [JP] Japan ................................ 5-353893
Jul. 5, 1994 [JP] Japan ................................ 6-177459

[51] Int. Cl.⁶ .............................. G06F 19/00; H04L 5/00
[52] U.S. Cl. .................... 395/200.17; 370/13; 345/157; 345/168; 340/825.44; 395/793
[58] Field of Search .................. 395/200.17, 850, 395/849, 898, 793; 379/142; 340/286.01, 311.1, 825.44; 370/313, 314; 345/157, 168

[56] References Cited

U.S. PATENT DOCUMENTS

| | | | |
|---|---|---|---|
| 4,644,472 | 2/1987 | Montgomery | 395/849 |
| 4,713,808 | 12/1987 | Gaskill et al. | 370/94.1 |
| 4,759,022 | 7/1988 | Akerberg | 371/5.1 |
| 4,852,045 | 7/1989 | Kraul et al. | 395/490 |
| 4,952,927 | 8/1990 | DeLuca et al. | 340/825.44 |
| 4,967,194 | 10/1990 | Haruki | 340/825.44 |
| 5,050,166 | 9/1991 | Cantoni et al. | 370/94.1 |
| 5,293,484 | 3/1994 | Dabbs et al. | 395/201 |
| 5,384,700 | 1/1995 | Lim et al. | 395/793 |
| 5,452,356 | 9/1995 | Albert | 380/9 |

OTHER PUBLICATIONS

Kramer, Matt "Paging-software programs show broader messaging capabilities" PC Week v11 n25 p. 116(3), Jun. 27, 1994.

"Advance pocket pagers to debut in Japan" Newsbytes, Feb. 09, 1994.

*Primary Examiner*—Dinh C. Dung
*Attorney, Agent, or Firm*—Frishauf, Holtz, Goodman, Langer & Chick

[57] ABSTRACT

When one message data is transmitted dividedly at plural times to the same reception terminal, in the first transmission, a code specifying the terminal is transmitted, and then message data in a head portion of the message and a code indicating that succeeding data is present are transmitted, in the second transmission and thereafter, the code specifying the terminal is transmitted, and then data succeeding to the transmitted message data and a code indicating that the previously transmitted message data is continued from message data received at this time, and, unless the second transmission and thereafter is the last transmission, the message data having a code indicating that succeeding data is present are transmitted. The reception terminal receives transmitted data, and connects message data transmitted dividedly at plural times as one message data based on the code attached to the received message data.

18 Claims, 31 Drawing Sheets

| DATA | PUSH-BUTTON OPERATION |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| U (URGENCY SYMBOL) | *0 |
| -- (HYPHEN) | *2 |
| [ (LEFT BRACKET) | *4 |
| ] (RIGHT BRACKET) | *6 |
| SPACE | *8 |
| END SYMBOL | # |
| CORRECTION SYMBOL | ** |

FIG.2

| COL.<br>ROW | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | : | ? | , | . |
| 7 | マ | ミ | ム | メ | モ | ァ | ィ | ェ | ォ | ッ |
| 8 | ヤ | ( | ユ | ) | ヨ | ャ | ュ | ョ | — | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

FIG.5

| SHORTENED NO. (MESSAGE NO.) | TELEPHONE NO. INFORMATION (MESSAGE) | IDENTIFICATION INFORMATION |
|---|---|---|
| 01 | SHINJI HIDAKA<br>0425-12-1234 | |
| 02 | SHINJI HIDAKA<br>03-5123-1234 | P |
| 03 | ABC COMPUTER CO.<br>03-3777-0000 | |
| 04 | SATOSHI SATO<br>03-5000-9999 | P |
| 05 | OHISHI<br>0425-79-1111 | |

FIG.8

| CALL ID | MESSAGE DATA |

FIG. 15

FIG. 16A U7960067980052 8021−
- FREE MESAGE CODE: 10 : 30 ニ カ
- CONNECTION CODE

FIG. 16B −71328652804010 37−
- CONTINUING CODE: イ シャ ニ TEL
- CONNECTION CODE

FIG. 16C −7244234104 3112
- CONTINUING CODE: シ テ ク ダ サ イ

FIG. 16D U711232449380853 215
- FREE MESSAGE CODE: ア イ シ テ ル ヨ シ オ

FIG.18A 123456789012345678[[
CONNECTION CODE
FIG.18B ]]9012345678901234[[
 
CONTINUING CODE          CONNECTION CODE
FIG.18C ]]567890 1234567890
CONTINUING CODE

FIG.22A  U7 4̂3̂(ツ) 2̂5̂(コ゛) 0̂4̂(ウ) 1̂3̂(ノ) 5̂5̂(ヨ) 8̂5̂(イ) 1̂2̂(シ) 3 2 –

Under "U": FREE MESSAGE CODE  
Under "32": CONNECTION CODE

Reading: U7 43(ツ) 25(コ゛) 04(ウ) 13(ノ) 55(ヨ) 85(イ) 12(シ) 32 –

FIG.22B  _7 0̂4̂(゛) 2̂1̂(カ) 0̂3̂(ン) 5̂2̂(ニ) 8̂0̂(レ) 9̂4̂(ン) 0̂3̂9̂(ラ) 1 _

Under "_7": CONTINUING CODE  
Under "91": CONNECTION CODE

FIG.22C  U3 1̂2̂(イ) 4̂3̂(ツ) 7̂5̂(モ) 5̂5̂(ノ) 6̂1̂(ハ) 0̂4̂(゛) 3̂2̂(シ) 8̂8̂(ョ) –

Under "U": FREE MESSAGE CODE  
Under "88": CONNECTION CODE

FIG.22D  _7 2̂3̂(ク) 3̂2̂(シ) 4̂4̂(テ) 2̂3̂(ク) 4̂1̂(タ) 0̂4̂(゛) 3̂1̂(サ) 1̂2̂(イ)

Under "_7": CONTINUING CODE

FIG.22E  _3 4̂4̂(テ) 0̂4̂(゛) 8̂0̂(マ) 7̂1̂(ッ) 7̂0̂(テ) 4̂4̂(マ) 7̂1̂(ス) 3̂3̂

Under "_3": CONTINUING CODE

FIG.23A   1 2 3 4 5 6 7 8 9 0 1 2 3 4 5 6 7 [ [ 7

- [[7 — IDENTIFICATION INFORMATION / CONNECTION CODE

FIG.23B   ] ] 7 8 9 0 1 2 3 5 6 7 8 9 0 1 2 [ [ 7

- ]]7 — IDENTIFICATION INFORMATION / CONTINUING CODE
- [[7 — IDENTIFICATION INFORMATION / CONNECTION CODE

FIG.23C   ] ] 7 3 4 5 6 7 8 9 0 1 2 3 4 5 6 7 8 9

- ]]7 — IDENTIFICATION INFORMATION / CONTINUING CODE

| SHORTENED NO. (MESSAGE NO.) | TELEPHONE NO. INFORMATION (MESSAGE) | IDENTIFICATION INFORMATION |
|---|---|---|
| 01 | SHINJI HIDAKA<br>0425-12-1234 | |
| 02 | SHINJI HIDAKA<br>03-5123-1234 | P1 |
| 03 | ABC COMPUTER CO.<br>03-3777-0000 | |
| 04 | SATOSHI SATO<br>03-5000-9999 | P2 |
| 05 | OHISHI<br>0425-79-1111 | |
| | | |

FIG.32

APPARATUS AND METHOD FOR DIVIDEDLY TRANSMITTING AND RECEIVING MESSAGE DATA USING CONNECTION CODES APPENDED AS PART OF THE TRANSMISSION PACKETS DATA FIELD

BACKGROUND OF THE INVENTION

1. Field of the Invention

The present invention relates to a method of dividedly transmitting message data used when an amount of message data to be transmitted exceeds an amount of data allowed in a data communication system and a method of receiving the message data, and relates to a message data transmitting apparatus used to transmit divided message data and a message data receiving apparatus used to receive the divided message data.

2. Description of the Related Art

There are some data communication systems in which, in order to improve the usage efficiency of the communication network, an amount of message being capable of transmitting at a time is limited. For example, in a radio paging system, an amount of message transmitted to a numeral display type pager is limited by 12 numerals (in case of NTT) or 20 numerals (in case of NCC).

Therefore, if the limited number of character is 12 numerals, just the telephone number of the destination can be transmitted and, if the limited number of character is 20 numerals, time information can be transmitted in addition to the telephone number of the destination, but day and time designating information cannot be transmitted.

In recent, such pager that has a built-in conversion table for making two digits correspond to each character of kana, alphabet etc. and, when conversion designate code as well as numeric data is received as message data, the numeric data is converted into kana, alphabet etc. every two digits and thereafter displayed has been developed. The transmitter can transmit his or her desired message to the pager using kana and alphabet. However, in case the number of limited character in the data communication system is set as 12 numerals, only 5 characters can be transmitted whereas, in case the number of limited character in the data communication system is set as 20 numerals, only 9 characters can be transmitted. Therefore, the caller cannot transmit his or her message sufficiently.

Accordingly, if the caller would like to transmit message having a data amount exceeding the limited value, he or she must transmit message dividedly at plural times. While, the pager informs a call incoming every time when it receives the message and, in case the message received and stored is redisplayed, the message is read and displayed in the reverse order they are received.

As described above, in the conventional data communication system, if the caller wishes to transmit message having a data amount exceeding the limited value, he or she must transmit message dividedly at plural times. While, the pager informs a call incoming every time when it receives the message and, in case the message received and stored is redisplayed, the message is read and displayed in the reverse order they are received.

Consequently, following drawbacks are present in the conventional data communication system. That is, since dialing of the telephone number of the destination must be effected every time when transmitter transmits the message, a transmission operation becomes troublesome. Further, if the transmitter transmit one message dividedly at plural times, the receiver can sufficiently confirm the received message after all messages are completely received by the receiver. However, since the call incoming is informed every time when each piece of dividedly transmitted message is received, frequent informing sound becomes noisy. In addition, since the dividedly transmitted message is displayed and confirmed in the reverse order they are received, it is hard to grasp the contents of the message.

In this case, if the dividedly transmitted message is transmitted in a reverse order in the transmitter side, it becomes easy to grasp the contents of the displayed message in the receiver side, but transmitting operations effected in the transmitter side becomes troublesome.

SUMMARY OF THE INVENTION

Objects of the present invention are to provide a method of dividedly transmitting message data and a message data transmitting apparatus capable of transmitting lengthy message data readily and to provide a method of receiving message data and a message data receiving apparatus capable of performing a reception process of dividedly transmitted message data effectively.

According to an aspect of the present invention, there is provided a method of transmitting message data dividedly at plural times, the method comprising the steps of: transmitting data in head portion of the message data and first code indicating that succeeding data is present, in the first transmission; transmitting data succeeding to the transmitted message data and second code indicating that data received at this time is a following data from a previously transmitted data, in the second transmission; and transmitting data succeeding to the transmitted message data, the first code and the second code unless the second transmission is the last transmission.

According to another aspect of the present invention, there is provided a method of transmitting message data dividedly at plural times if an amount of data of the message data to be transmitted exceeds an amount of transmission data allowed in a predetermined communication system, the method comprising the steps of: displaying an input range exceeding an allowable amount of transmission data when input transmission message are displayed; transmitting dividedly transmitted message data, to each of which connection information indicating connection relation therebetween is attached, when the message data composed of data which is input in excess of the input range displayed are dividedly transmitted; and displaying sequentially a range of divided transmission of the message data when the dividedly transmitted message data are transmitted.

According to still another aspect of the present invention, there is provided a method of receiving message data dividedly transmitted via a predetermined communication system, comprising the steps of: informing a call incoming after all dividedly transmitted message data is received, when connection information attached to each of dividedly transmitted message data and indicating connection relation therebetween is recognized; connecting the dividedly transmitted message data based on the connection information attached to each of dividedly transmitted message data received; and displaying received and connected message.

According to still further aspect of the present invention, there is provided a message data transmitting apparatus for transmitting message data dividedly at plural times if an amount of data of the message data to be transmitted exceeds an amount of transmission data allowed in a predetermined communication system, including: means for inputting data; means for displaying transmission message composed of data input by the inputting means; means for transmitting the transmission message displayed on the displaying means; the apparatus comprising: display controlling means for displaying an input range exceeding an allowable amount of transmission message input by the inputting means are displayed, and for controlling the displaying means so as to display sequentially a range of divided transmission when message exceeding the allowable amount of transmission data are dividedly transmitted; and information attaching means for attaching connection information indicating connection relation therebetween to each of dividedly transmitted message data when the message data are dividedly transmitted.

According to still further aspect of the present invention, there is provided a message data receiving apparatus for receiving message data dividedly transmitted via a predetermined communication system, comprising: means for recognizing connection information attached to each of dividedly transmitted message data and indicating connection relation therebetween, and for recognizing a completion of reception of all dividedly transmitted message data by recognizing the connection information; means for informing a call incoming according to a result of recognition by the recognizing means after a reception of message data is completed; means for connecting dividedly transmitted message based on the connection information attached to each of dividedly transmitted message data received; and means for displaying received and connected message.

According to still further aspect of the present invention, there is provided a message data receiving apparatus for receiving message data dividedly transmitted via a predetermined communication system, comprising: means for storing a plurality of received message data; means for counting a predetermined time every message data stored in the storing means; and controlling means for canceling the received message data when the same message data as message data while being counted by the counting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a diagram showing an example of the corresponding relation between a key operation of a push-phone and data;

FIG. 5 is a diagram showing a numeral-character conversion matrix table stored in a conversion table in FIG. 4;

FIG. 8 is a diagram showing a structure of a TEL bank memory 54 in FIG. 4;

FIG. 15 is a diagram showing a structure of a calling signal transmitted from radio base stations 7 to 9 in FIG. 1;

FIGS. 16A to 16D are diagrams each showing a structure of each message data consisting of character data dividedly transmitted;

FIGS. 18A to 18C are diagrams each showing a structure of each message data consisting of numeric data dividedly transmitted;

FIGS. 22A to 22E are diagrams each showing a structure of each message data consisting of character data dividedly transmitted;

FIGS. 23A to 23C are diagrams each showing a structure of each message data consisting of numeric data dividedly transmitted;

FIG. 32 is a diagram showing a structure of a TEL bank memory 92 in FIG. 31.

DETAILED DESCRIPTION OF THE PREFERRED EMBODIMENTS

There will now be described embodiments of the present invention hereinafter with reference to the attached drawings.

(First Embodiment)

A first embodiment of the present invention will be discussed with reference to FIGS. 1 to 18. The first embodiment is an example in which the present invention is applied to a radio paging system.

Figure 1:
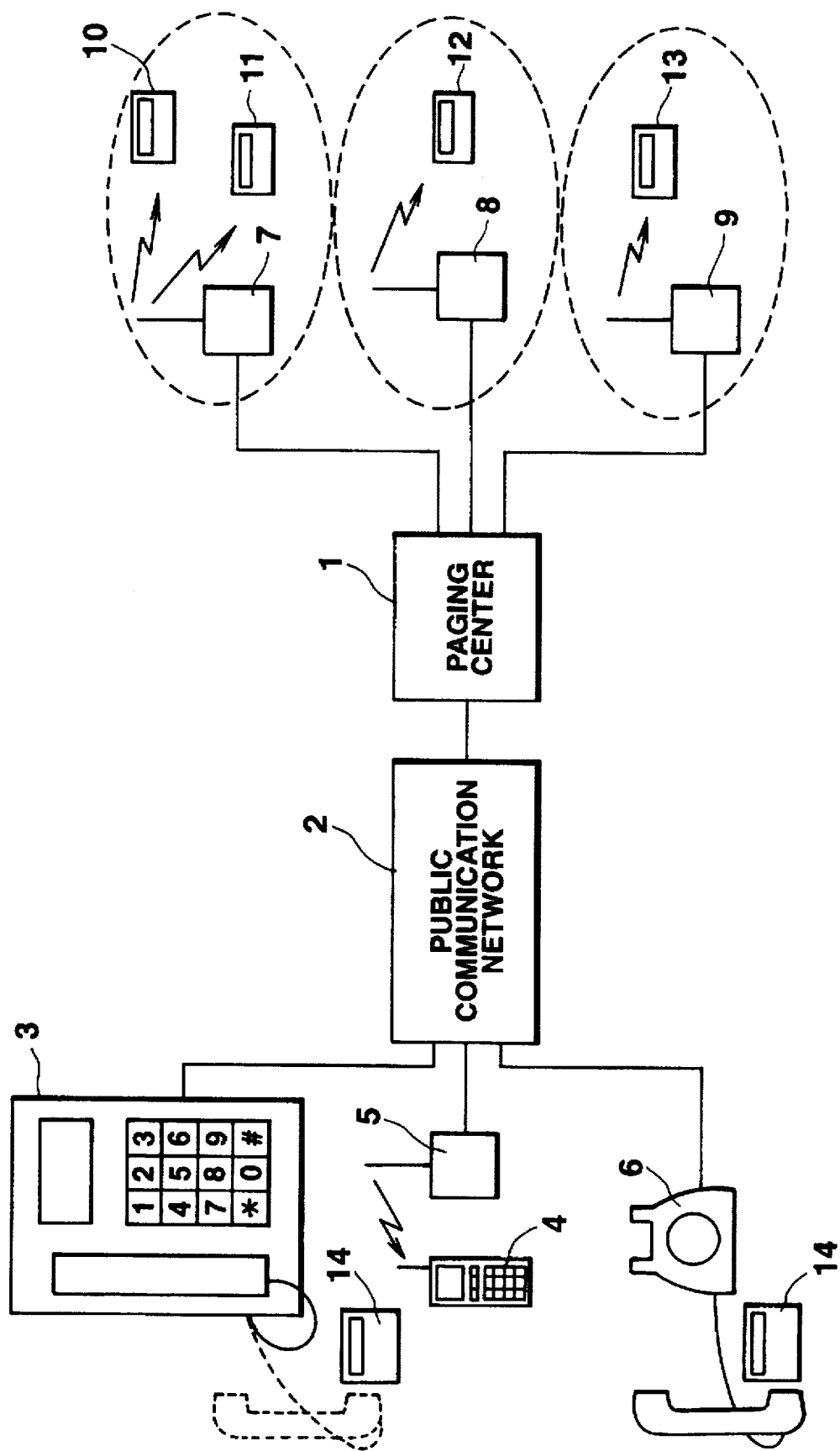
FIG. 1 is a diagram showing a schematic structure of a radio paging system.

FIG. 1 shows the schematic construction of a radio paging system. In FIG. 1, 1 denotes a paging center. The paging center 1 is connected to a push-phone 3, radio base station 5 for portable telephone 4, dialing type telephone 6 and the like via a public communication network 2. Further, the paging center 1 is connected to a plurality of transmission radio base stations 7 to 9. In FIG. 1, 10 to 13 denote paging receivers.

The paging center 1 receives a call number and message data of the paging receiver input from the push-phone 3, portable telephone 4, or dialing type telephone 6 via the public communication network 2 and transmits them to the radio base stations 7 to 9 after subjecting them to a preset signal processing. As a result, message data and an ID code (identification code) for individually and selectively calling the paging receivers are transmitted from the radio base stations 7 to 9 and one of the paging receivers to which the same ID code as the transmitted ID code is assigned receives the transmitted message.

When message data is input from the push-phone 3 or portable telephone 4, the dial keys of the push-phone 3 or portable telephone 4 are operated to input the call number of the paging receiver and the dial keys thereof are operated according to message data to be transmitted after the paging center 1 is connected to the telephone line via the public communication network 2.

When message data is input from the dialing type telephone 6, message data to be transmitted is previously set in a tone dialer 14 which can output a DTMF (Dual Tone Multi-Frequency) signal sound, the dial of the dialing type telephone 6 is operated to input the call number of the paging receiver, the tone dialer 14 is applied to the transmitter and a tone corresponding to the message data is output from the tone dialer 14 after the paging center 1 is connected to the telephone line via the public communication network 2. That is, the push-phone 3, portable telephone 4 and tone dialer 14 can be used as a message transmitter in this invention. Further, the tone dialer 14 can be used as the message transmitter of the push-phone 3.

FIG. 2 is a diagram showing the relation between data and the key operation of the push-phone 3 for message input used in the presently available radio paging system. It is assumed that the message input in the radio paging system of this embodiment is also effected based on the above relation. In FIG. 2, an end symbol and correction symbol are indication data for the paging center and the two data items are not transmitted to the paging receiver.

Figure 3:
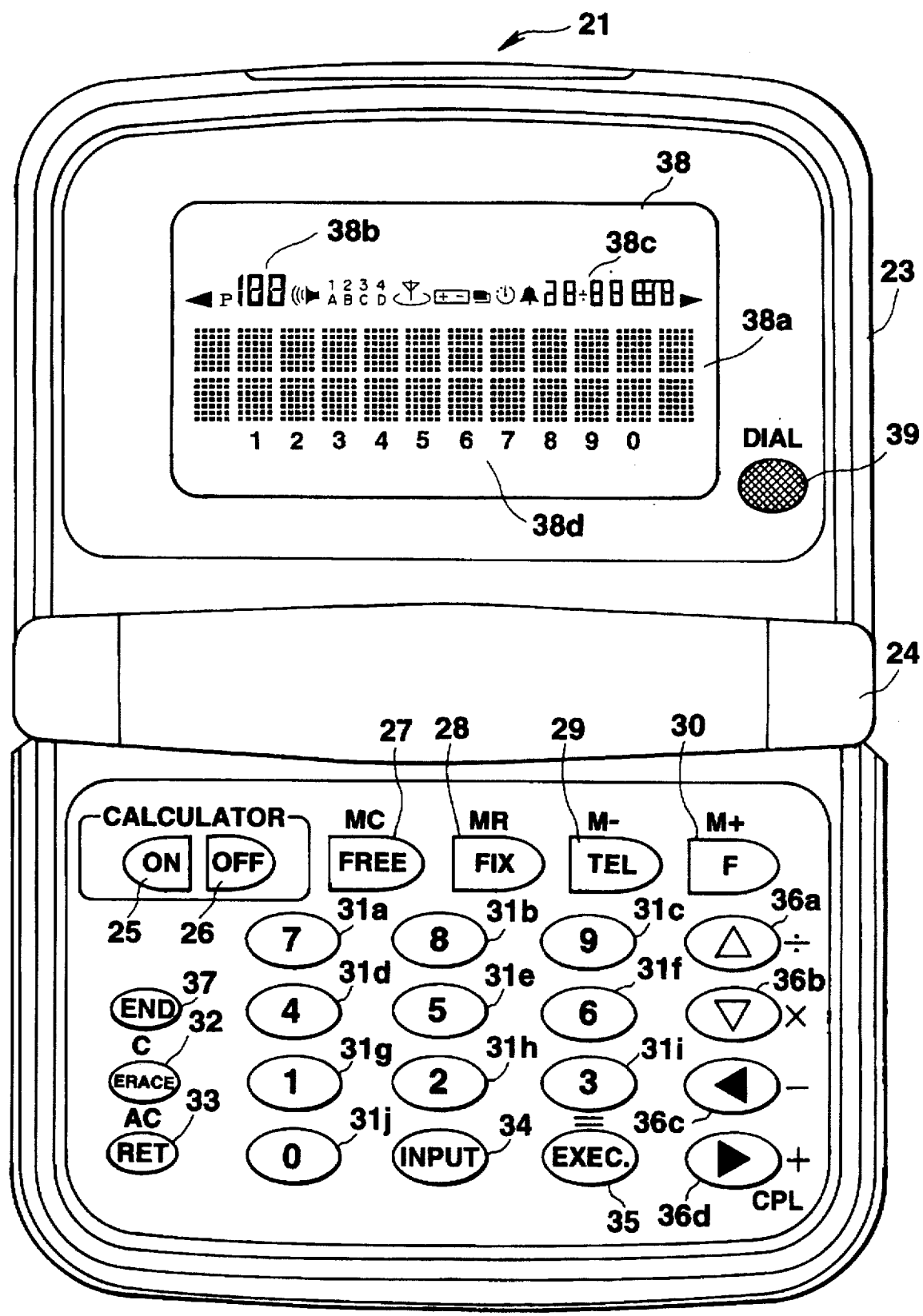
FIG. 3 is a diagram showing an appearance of an electronic device according to the first embodiment of the present invention.

FIG. 3 shows the appearance of an electronic device which can be used for both of the tone dialer 14 used as the message transmitter in the radio paging system shown in FIG. 1 and the paging receivers 10 to 13 used as the message receivers in the above radio paging system.

That is, the electronic device of this embodiment has a tone dialer function and a pager function. In addition, the electronic device has an electronic desk calculating function and a telephone book function.

First, the construction thereof is explained.

FIG. 3 shows the appearance of an electronic device 21 of this embodiment, and in FIG. 3, 22 denotes the main body portion of the device, 23 denotes a lid portion thereof, and 24 denotes a hinge portion for rotatably supporting the lid portion 23 on the main body portion 22.

As shown in FIG. 3, an ON key 25 and OFF key 26 used for the electronic desk calculating function, a free message key 27, a fixed form message key 28, a TEL bank key 29, a function key 30, numeral keys 31a to 31j, an erase key 32, a return key 33, an input key 34, an execution key 35, cursor keys 36a to 36d and an end key 37 are provided on the upper surface of the main body portion 22, and on the internal surface of the lid portion 23, a liquid crystal display section 38 and a dial key 39 are provided.

Although not shown in the drawing, sound generation holes of a DTMF tone generation speaker are formed in the left side surface of the main body portion 22 and switches for switching the ON/OFF of the power supply and the ON/OFF of a sound at the time of call incoming and sound generation holes of a call incoming informing sound generation speaker are provided on the right side surface of the main body portion.

The ON key 25 for the electronic desk calculating function is a key for specifying the setting of the electronic desk calculating function mode and the OFF key 26 is a key for specifying the releasing or resetting of the electronic desk calculating function mode set by the ON key 25. If the electronic desk calculating function mode is set by the operation of the ON key 25, the keys 27 to 30 and 32 to 36d are set to the respective functions indicated by the letters printed in adjacent positions so that the arithmetic operations or the like can be effected. The free message key 27 is a key for setting the "message forming mode", the fixed form message key 28 is a key for setting a mode in which a fixed form message stored in a message memory 43 described later is displayed, the TEL bank key 29 is a key for setting the "TEL bank mode", and the function key 30 is a key for setting other modes such as the "fixed form message mode", "message registration/transmission mode" and "time correction mode".

The numeral keys 31a to 31j are keys for specifying the input of numerals and specifying the input of Japanese characters ("kana" or "katakana") and alphabetical characters by a method described later. The erase key 32 is a key for specifying the erasing of character data which is now input, the return key 33 is a key for specifying the end of each mode processing, the input key 34 is a key for specifying registration of data input by the key operation into the memory, and the execution key 35 is a key for specifying execution of various processes in each mode.

In the first embodiment, the execution key 35 also specifies the conversion of the transmission message data into key operation data of the push-phone. The cursor keys 36a to 36d are keys used for sequentially reading information items stored in respective memories described later, for example. The cursor keys 36a and 36b are used for switching of input character groups in the "message forming mode" or the like in addition to the above functions, and the cursor key 36d is used for specifying the linkage between a message formed as will be described layer and the pager TEL No. The end key 37 is a key for specifying the end of the input operation of a message, and the dial key 39 is a key for specifying the output of a dial tone.

The liquid crystal display section 38 displays various information in each mode, and includes a main display section 38a for displaying received message information, key-input information, information read out from each memory and the like, a display section 38b for displaying the bank number of the memory in which information read out and displayed is stored, a display section 38c for displaying the present time and the time of reception, a display section 38d for displaying a guidance number for character input and the like.

Figure 4:
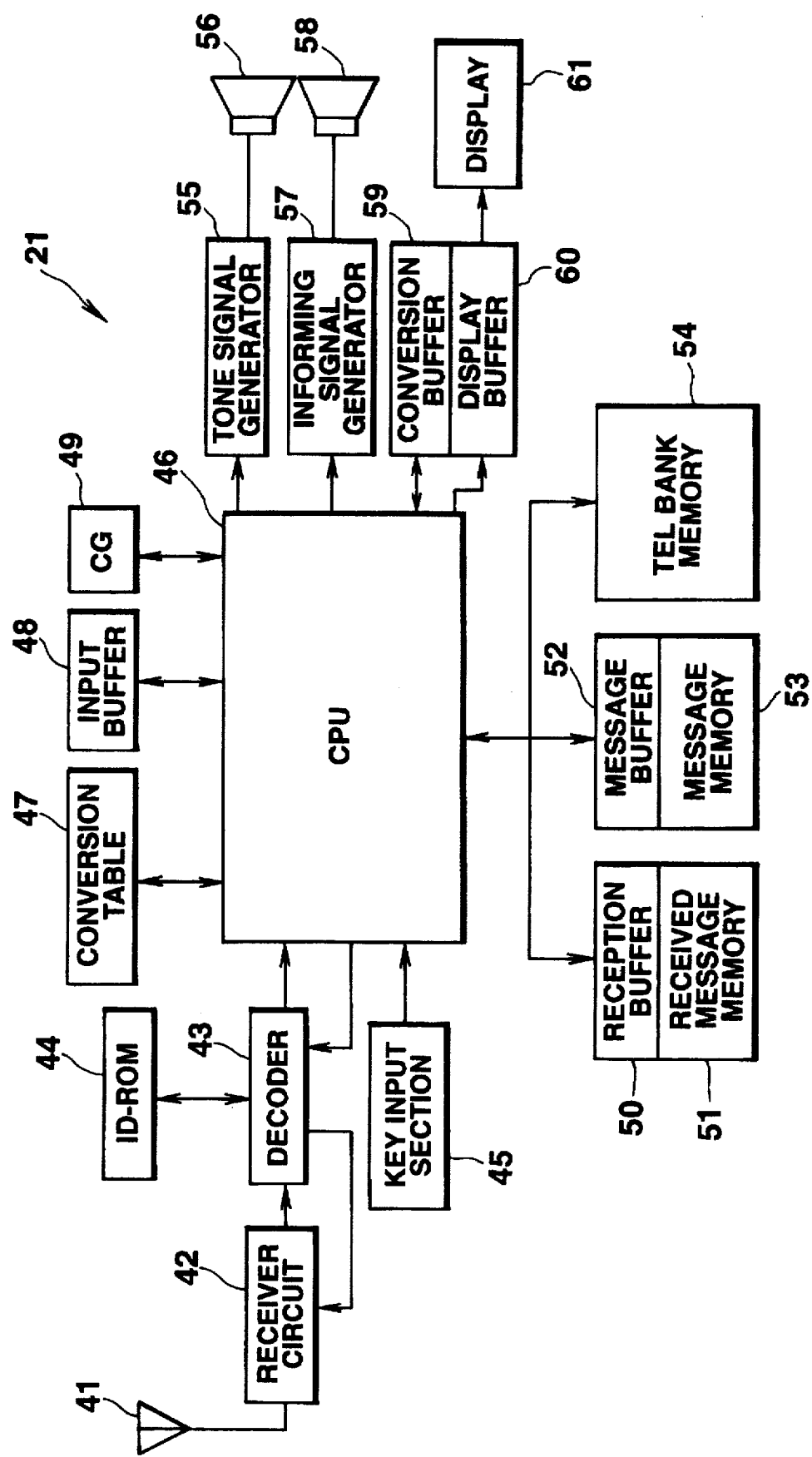
FIG. 4 is a block diagram showing a structure of the electronic device according to the first embodiment in FIG. 3.

FIG. 4 is a block construction diagram of the electronic device 21 shown in FIG. 3 and the electronic device 21 of this embodiment includes an antenna 41, receiver circuit 42, decoder 43, ID-ROM 44, key input section 45, CPU 46, conversion table 47, input buffer 48, character generator (CG) 49, reception buffer 50, received message memory 51, message buffer 52, message memory 53, TEL bank memory 54, tone signal generator 55, speaker 56, informing signal generator 57, speaker 58, conversion buffer 59, display buffer 60 and display section 61.

The antenna 41 receives a call signal transmitted by radio from the radio base stations 7 to 9 shown in FIG. 1 and outputs the call signal to the receiver circuit 42. The receiver circuit 42 is controlled by an intermittent signal input from the decoder 43 to intermittently receive a call signal input from the antenna 41, amplify and decode the received signal, and output the signal to the decoder 43.

The decoder 43 determines whether or not the ID code of the call signal input from the receiver circuit 42 coincides with its own recognition code by referring to the ID-ROM 44 in which the recognition code is previously registered, and if the coincidence is detected, it outputs a call detecting signal to the CPU 46, causes the receiver circuit 42 to continuously receive a signal and outputs a successively received message to the CPU 46. The key input section 45 includes various keys shown in FIG. 3 and outputs the specifications from the keys.

The conversion table 47 stores a numeral-character conversion matrix table shown in FIG. 5 and is used when character data is converted into numeric data or numeric data is converted into character data. The input buffer 48 is used to temporarily store transmission message character data input by the operation of keys such as numeral keys in the key input section 45. The character generator 49 generates a plurality of character patterns to be displayed on the display section 61 according to a request from the CPU 46 and outputs them to the CPU 46.

Figure 6:
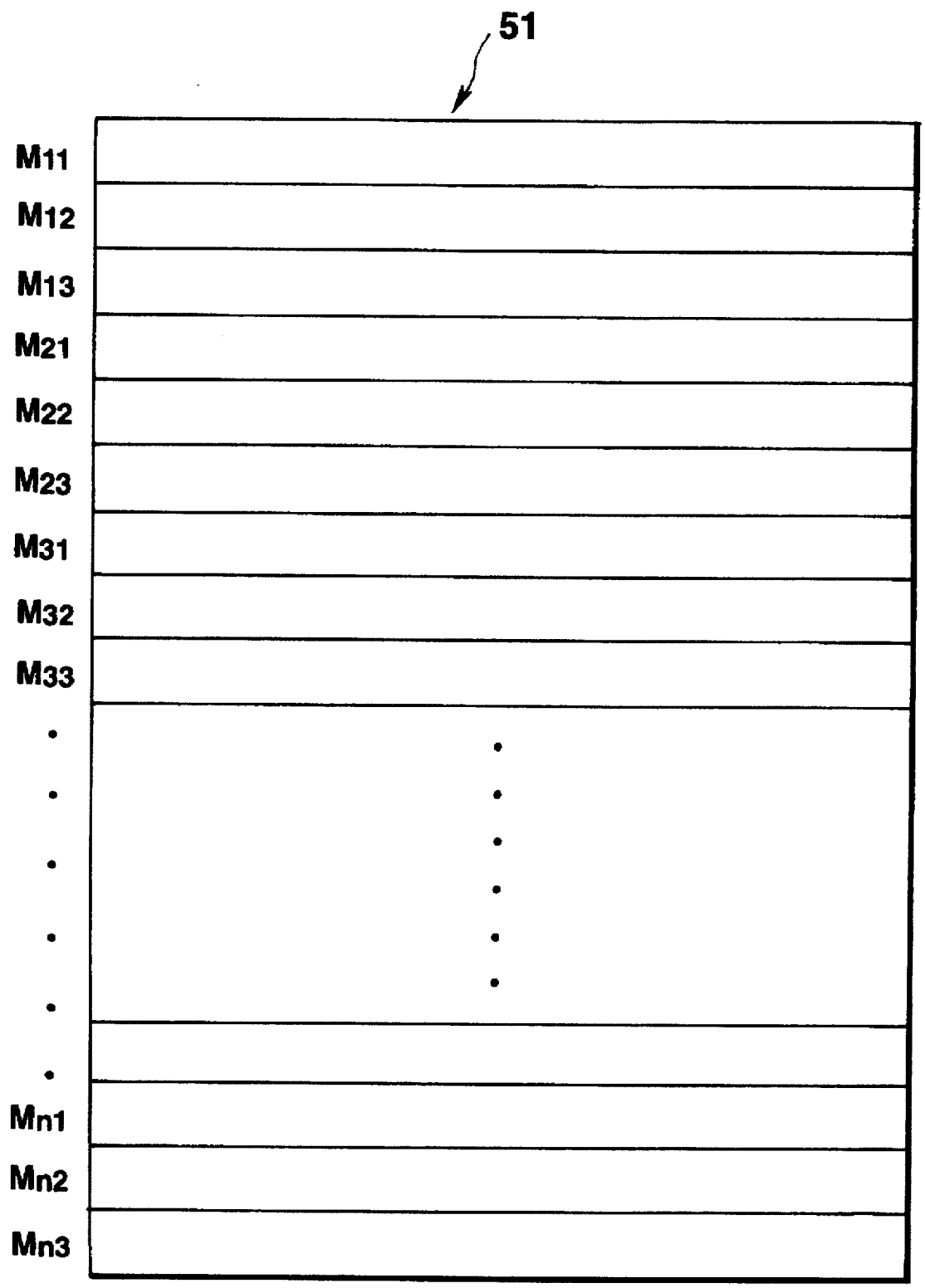
FIG. 6 is a diagram showing a structure of a reception message memory 51 in FIG. 4.

The reception buffer 50 forms a memory area for temporarily storing received message information transferred between the CPU 46 and the received message memory 51. The received message memory 51 includes a plurality of memory banks M11 to Mn3 as shown in FIG. 6 and each of the memory banks M11 to Mn3 has a memory capacity for storing message data (corresponding to a 20-digit number) of one reception input via the reception buffer 50 from the CPU 46.

The memory banks M11 to Mn3 are divided into n groups, and in a case wherein message data stored in the first memory bank Mi1 of each group is message data to which a connection code described later is attached, the second and third memory banks Mi2, Mi3 of the group are used to store succeeding message data.

The message buffer 52 forms a memory area for temporarily storing message information transferred between the CPU 46 and the message memory 53.

Figure 7:
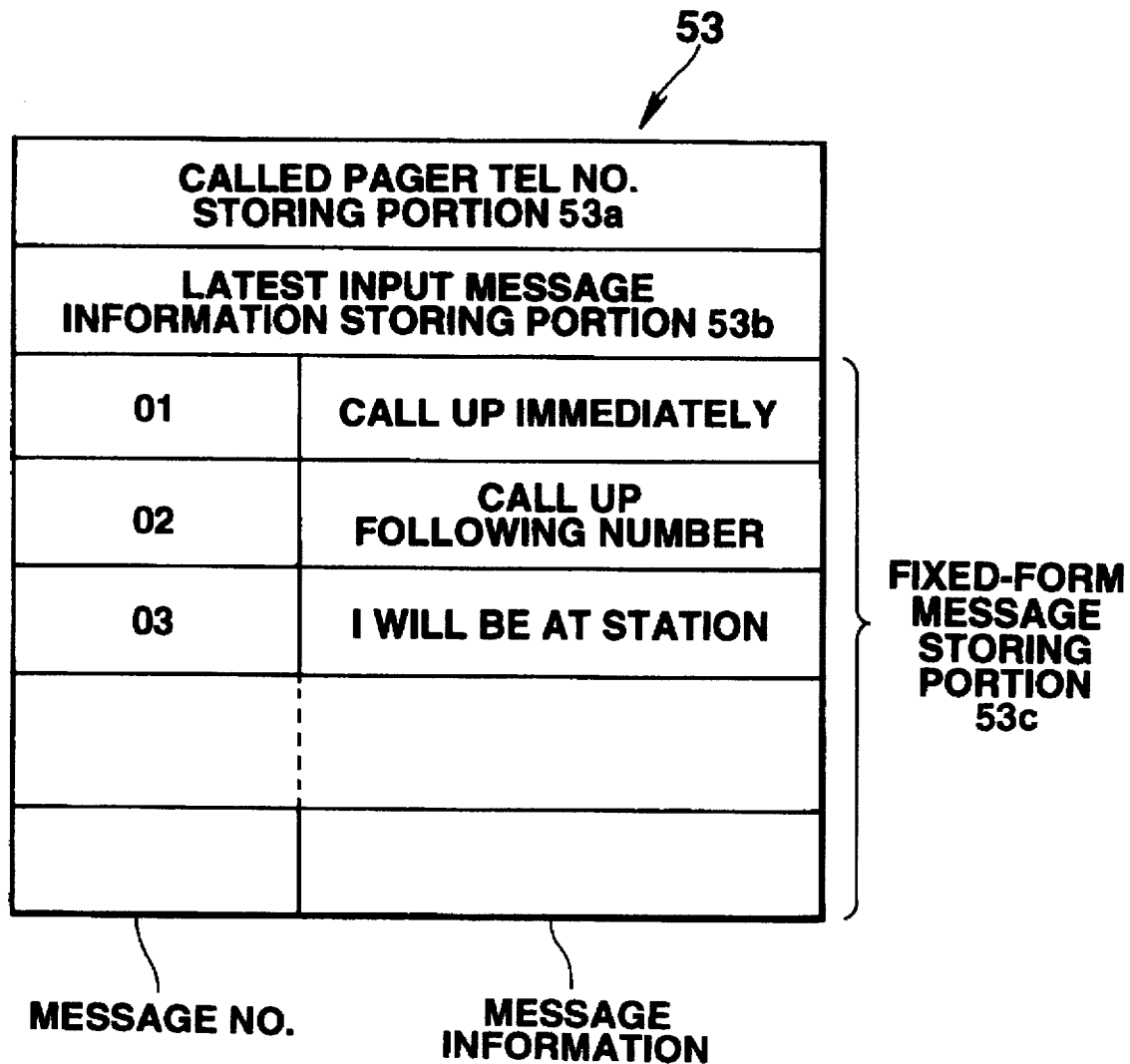
FIG. 7 is a diagram showing a structure of a message memory 53 in FIG. 4.

As shown in FIG. 7, the message memory 53 includes a called pager TEL No. storing portion 53a, latest input message information storing portion 53b, and a fixed-form message storing portion 53c having a plurality of memory banks and stores message information input from the CPU 46 via the message buffer 52 into the latest input message information storing portion 53b or both of the storing portion 53b and the fixed-form message storing portion 53c.

As shown in FIG. 8, the TEL bank memory 54 has a plurality of memory banks and stores telephone number information input from the CPU 46 together with a shortened No. and pager identifying information "P" determining the call number of the pager.

The tone signal generator 55 converts numeric data input from the CPU 46 into a DTMF signal and outputs the signal from the speaker 56. The tone signal generator 55 and speaker 56 are used when numeric data input by converting the called pager telephone number and/or transmission message data is transmitted from the transmitter of the push-phone. The informing signal generator 57 causes the speaker 58 to output an informing sound which informs the call incoming in response to an informing instruction input from the CPU 46 after receiving a call signal to the informing signal generator 57 itself.

The reason why the DTMF tone generation speaker 56 and informing sound generation speaker 58 are separately provided is that the output volume levels are different from each other.

The conversion buffer 59 forms a memory area for temporarily storing message information read out from the received message memory 51 or the like by the CPU 46. The display buffer 60 forms a memory area for temporarily storing display character data and numeric data output from the CPU 46 to the display section 61.

The CPU (Central Processing Unit) 46 includes a ROM (Read Only Memory) which stores various control programs, a timer and an input register for holding the contents of the input operations in the key input section 45.

The CPU 46 executes various processes based on various control programs stored in the ROM. That is, when receiving a call detection signal from the decoder 43, it outputs an informing signal to the speaker 58 and causes the speaker 58 to inform that a call has been made and it stores reception message information next input from the decoder 43 into the received message memory 51 via the reception buffer 50. The CPU stores transmission message information input from the key input section 45 into the message memory 53 via the message buffer 52 and stores the telephone number information input from the key input section 45 into the TEL bank memory 54.

Further, when input of character data such as Japanese characters or alphanumerical characters is specified, the CPU 46 reads out a character pattern corresponding to the specification of the input from the character generator 49, stores the character pattern into the display buffer 60 and causes the display section 61 to display the character pattern.

Further, when receiving an output instruction of dial tone from the key input section 45 by the operation of the dial key 39, the CPU causes the tone signal generator 55 to convert the telephone number of transmission message information into a DTMF signal and output the signal from the speaker 56. A case wherein the transmission message information is constructed by character data is explained in more detail. The character data of the message information stored in the message memory 53 is read out into the conversion buffer 59, the readout character data is converted into 2-digit numeric data (character code) based on the conversion table 47, 3-digit numeric data "*07" indicating the free message code "U7" is attached to the head of the 2-digit numeric data, the above two numeric data items are converted into a DTMF signal by the tone signal generator 55 and output from the speaker 56.

Thus, the same signal as that obtained by the ten key operation in the push-phone can be transmitted to the telephone line via the transmitter of the telephone. Input of the end code to the telephone line can be effected by operating the "#" key of the push-phone or it may be output from the speaker 56 at the last time when the dial tone is output.

Further, when receiving the instruction of outputting a dial tone after receiving the instruction of setting the fixed-form message transmission mode from the key input section 45, the CPU 46 creates transmission data by use of a transmission specifying code, for example, 4-digit numeric data "*6*6" indicating "]]" and the message number input by the key operation and causes the tone signal generator 55 to convert the transmitting data into a DTMF signal and output the signal from the speaker 56.

Thus, the same signal as that obtained by the ten key operation in the push-phone can be transmitted to the telephone line via the transmitter of the telephone. Input of the end code to the telephone line can be effected by operating the "#" key of the push-phone or automatic output from the speaker 56, but in the case of transmission of the fixed-form message, it is preferable to input the end code by operating the "#" key of the push-phone by taking it into consideration that a plurality of fixed-form messages may be transmitted at one transmitting operation.

Further, as will be described later, the CPU 46 masks the input range exceeding the permissible transmission data amount at the time of input of the transmission message data. When the CPU causes the display section 61 to display the transmission message constructed by character data, the CPU causes the character data of the transmission message to be converted into numeric data in the same manner as in the case of output of the dial tone and causes the thus converted numeric data to be displayed on the display section 61 via the display buffer 60.

In addition, when transmitting the free message, the CPU 46 converts the character data into numeric data in the permissible range of transmission data amount, attaches a 3-digit numeral code "*07" indicating the free message code "U7" to the head of the converted numeric data, attaches a 2-digit numeral code "*2" indicating the connection code "-" to the end of the converted numeric data, and dividedly transmits the free message.

Further, when receiving a transmission signal having the free message code attached thereto after the calling ID, the CPU 46 retrieves the free message code by the call incoming process as will be described later, and when the free message code is detected, it retrieves the connection code attached after the message data following the connection code, and when the connection code is detected, it sets the successive reception mode based on the connection code, and when second and third message data items following the above message data are received, it sequentially stores the message data items into the memory banks Mi2, Mi3 following the memory bank Mi1 of the received message memory 51 in which the first free message data is stored, and connects together the free messages dividedly transmitted and received and registers the connected messages as one message.

In the CPU 46, a connection timer (not shown) for setting preset time (for example, 5 minutes) required for effecting the process for receiving and connecting divided free messages when divided transmission free messages which will be described later are received is provided.

Further, the CPU 46 contains a timepiece circuit, displays time on the display section 61 and sets the alarm time by use of the timepiece circuit.

Next, the operation in a case where the electronic device 21 of this embodiment is used as the transmitting device is explained.

Figure 9:
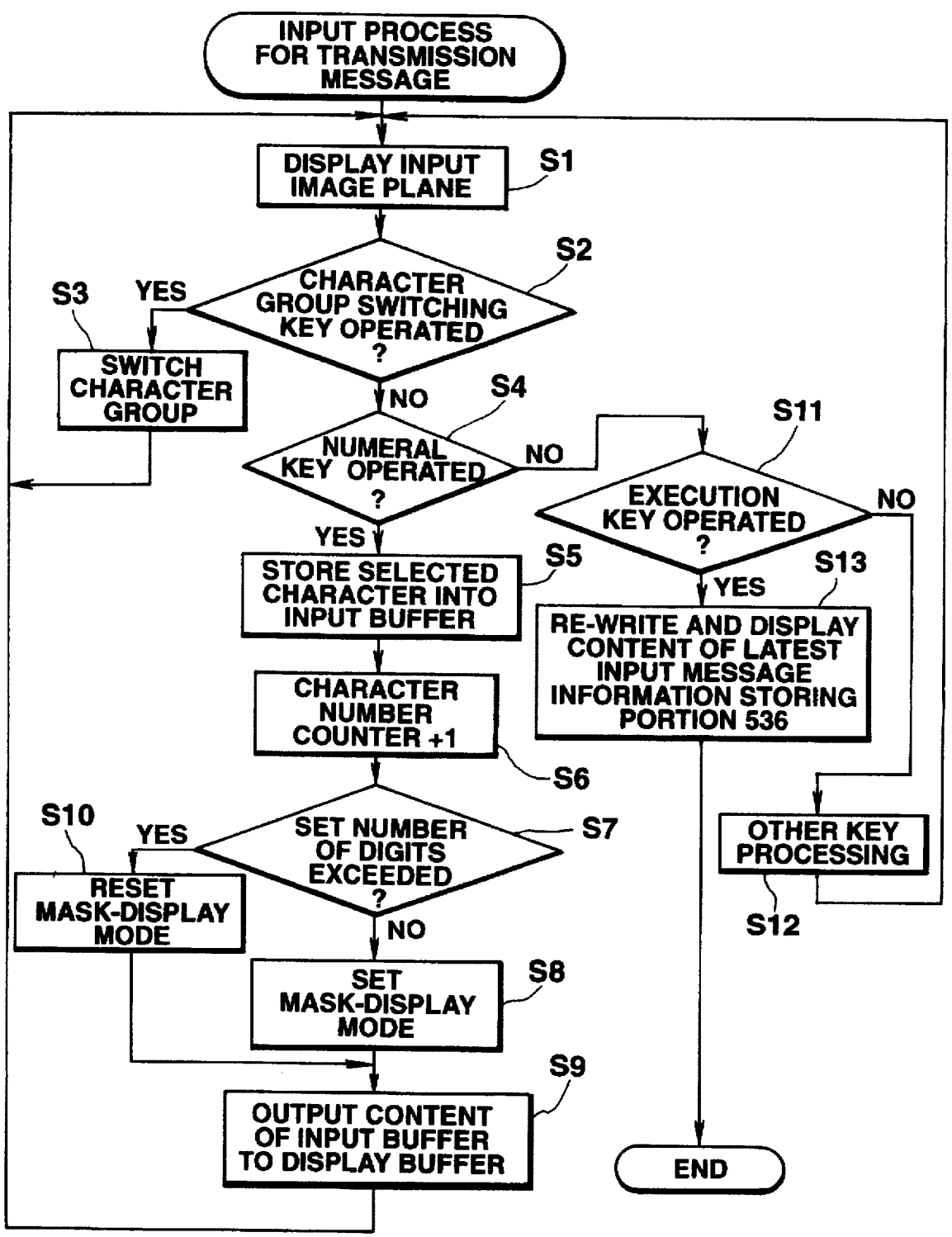
FIG. 9 is a flowchart illustrating an input process of transmission message, executed by the electronic device according to the first embodiment.

First, the input process of transmission message effected by the electronic device 21 of this embodiment is explained with reference to the flowchart shown in FIG. 9 and the display transition diagram shown in FIG. 10.

In this embodiment, it is assumed that if the data amount which can be transmitted at one time and is permitted by the message center 1 shown in FIG. 1 is set to a 20-digit number, that is, a message to be transmitted is a free message, message data of nine characters at maximum can be transmitted since the free message code attached to the head is a 2-digit number.

Figure 10:
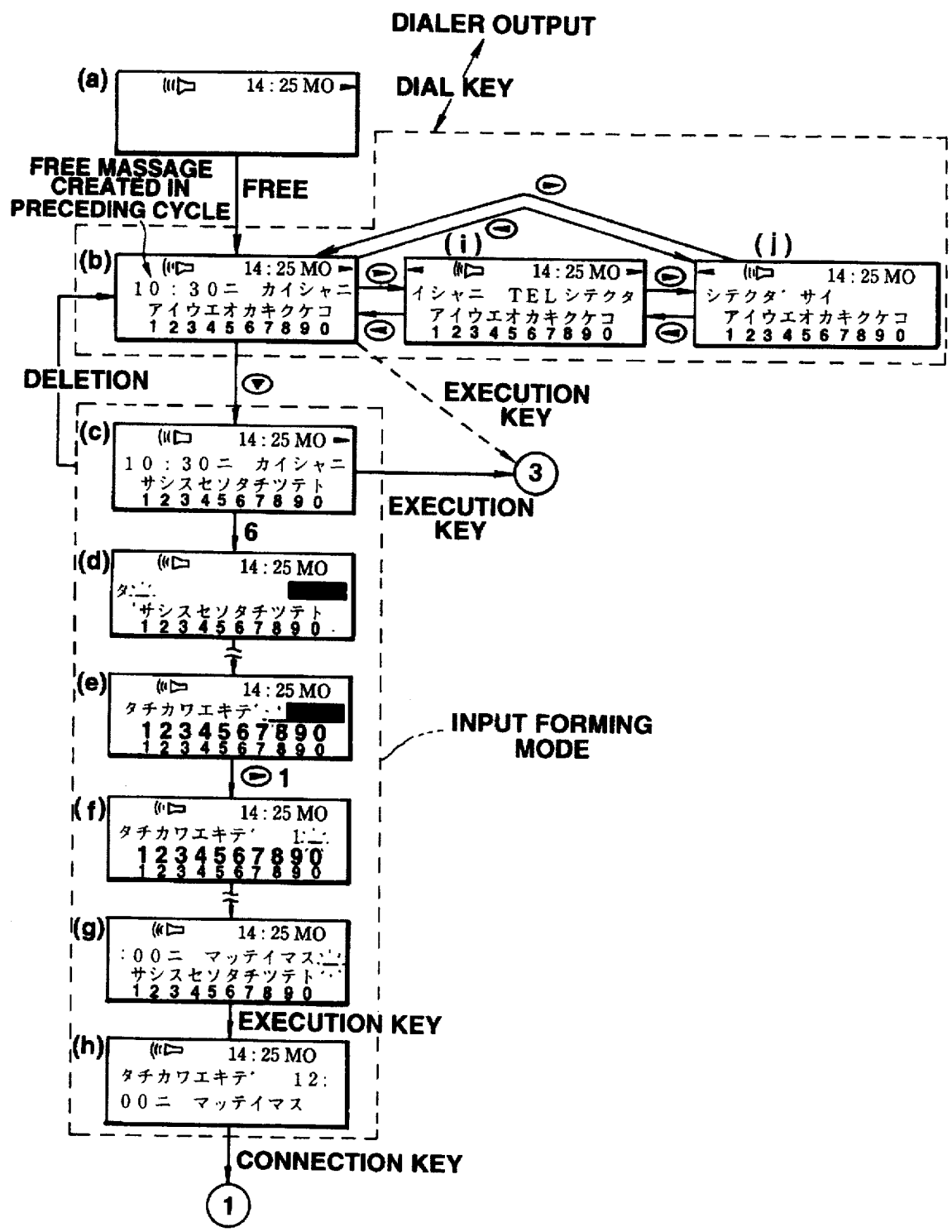
FIG. 10 is a diagram showing an example of display change state on a display 61 effected by the input process in FIG. 9.

For example, if the free message key 27 is operated in the display mode of the reception standby mode shown in (a) of FIG. 10, message information created in the preceding cycle is read out from the latest input message information storing portion 53b of the message memory 53 and displayed on the display section 61 as shown in (b) of FIG. 10 and the inputting character group (in this embodiment, ten characters on the columns of "ア" and "ﾊ") is displayed on the liquid crystal display section 61 (step S1).

If the key input operation is effected in this state, whether the key input operation is the character group switching operation by the cursor key 36a, 36b or not is determined (step S2). If it is the character group switching operation, the mode is switched to the input forming mode and the character group display on the display section 61 is switched according to the operated key (step S3). If the operated key is the key 36a, the character group display is switched to the ten characters on the columns of "ﾔ" and "ﾜ" as shown in (c) of FIG. 10. If it is not the character group switching operation, whether it is the character selecting operation by the numeral keys 31a to 31j or not is determined (step S4). When it is the character selecting operation by the numeral keys 31a to 31j, the mode is switched to the input forming mode and the selected character data is stored into the input buffer 48 (step S5) and the character number counter is counted up by "+1" (step S6).

Next, whether the count of the character number counter is larger than the set character digit number 9 or not is determined (step S7), and if it is not larger than the digit number, the mask-display mode is set (step S8), and as shown in (d) of FIG. 10, the input character range of tenth and succeeding digits is masked. Then, character data stored in the input buffer 48 is output to the display buffer 60 (step S9) and displayed on the display section 61 as shown in (d) of FIG. 10, and the process is returned to the step S1.

On the other hand, if it is detected in the step S7 that the set character digit number 9 is exceeded, the mask-display mode is reset (step S10), character data stored in the input buffer 48 is output to the display buffer 60 (step S9) and the input characters of tenth and succeeding digits are displayed as shown in (f) of FIG. 10, and the process is returned to the step S1.

Further, if it is determined in the step S4 that the key operation is not the character selecting operation by the numeral keys 31a to 31j, whether the key operation is the operation of the execution key 35 or not is determined (step S11). If it is determined that the key operation is not the operation of the execution key 35, a process corresponding to the key operation is effected and the process is returned to the step S1. If it is determined that the key operation is the operation of the execution key 35, it is determined that the present character input process is completed, the storage content of the latest input message information storing portion 53b of the message memory 53 is replaced by the storage content stored in the input buffer 48 in the present input process, the storage content stored in the input buffer 48 is written into the display buffer 60, and as shown in (h) of FIG. 10, the transmission message is displayed on the display section 61 (step S13) and the input process is terminated.

For example, if a message of "ﾀﾁｶﾜｴｷﾃ 12:00 ニ ﾏｯﾃｲﾏｽ (I wait for you at Tachikawa Station at 12:00)" is created in the input process of the transmission message, the cursor key 36b is operated to scroll the character string display so as to display the columns of "ﾃ" and "ｼ" ((c) in FIG. 10) in the initial image plane of the input forming mode of the transmission message shown in (b) of FIG. 10 and a key corresponding to the guidance number "6" of "ｼ" displayed as one of the input characters, that is, the numeral key 31f is first operated. By this key operation, "ｼ" in the character string is input and displayed and the preceding message display is erased ((d) in FIG. 10). Like the above key operation, those of the numeral keys 31a to 31j which correspond to the guidance numbers of "ﾃ", "ﾊ", "ﾜ", "ｴ", "ﾃ" are operated to input and display the character string ((d) to (g) in FIG. 10) and finally the execution key 35 is operated. As a result, a message of "ﾀﾁｶﾜｴｷﾃ12:00 ニ ﾏｯﾃｲﾏｽ (I wait for you at Tachikawa Station at 12:00)" is registered into the latest input message information storing portion 53b of the message memory 53 and displayed on the display section 61 as shown in (h) of FIG. 10 and the input process of the transmission message is terminated.

If the formed message information is stored not only into the latest input message information storing portion 53b but also into the fixed-form message information storing portion 53c, termination of the message input is specified by operation of the fixed-form key 28. This makes it possible to store the formed message information into an available bank of the fixed-form message storing portion 53c in such a form that the bank number of the available bank is set as the message number.

Further, in the state in which the free message formed in the preceding cycle and shown in (b) of FIG. 10 is displayed,
if the cursor key 36c, 36d is operated, the content of the free message lying outside the display area of the display section 61 is moved and displayed as shown in (i), (j) of FIG. 10. If the dial key 39 is operated in the display state of the free message, the CPU 46 reads out the registered message information from the latest input message information storing portion 53b of the message memory 53, converts the character data of the message into numeric data based on the numeral-character conversion matrix table of the conversion table 57 shown in FIG. 5, converts the thus converted numeric data into a DTMF signal by the tone signal generator 55 following on the 3-digit numeric data "*07" indicating the free message code "U7", and outputs the signal from the speaker 56, thus effecting the dialer output operation.

When the execution key 35 is operated in the display state shown in (b), (c) of FIG. 10, the process for transmitting only the message data as will be described later is effected, and when the connection key 36d is operated in the display state shown in (h) of FIG. 10, the connection process for connecting called pager telephone number data to the message data in the transmission process as will be described later is effected.

Figure 11:
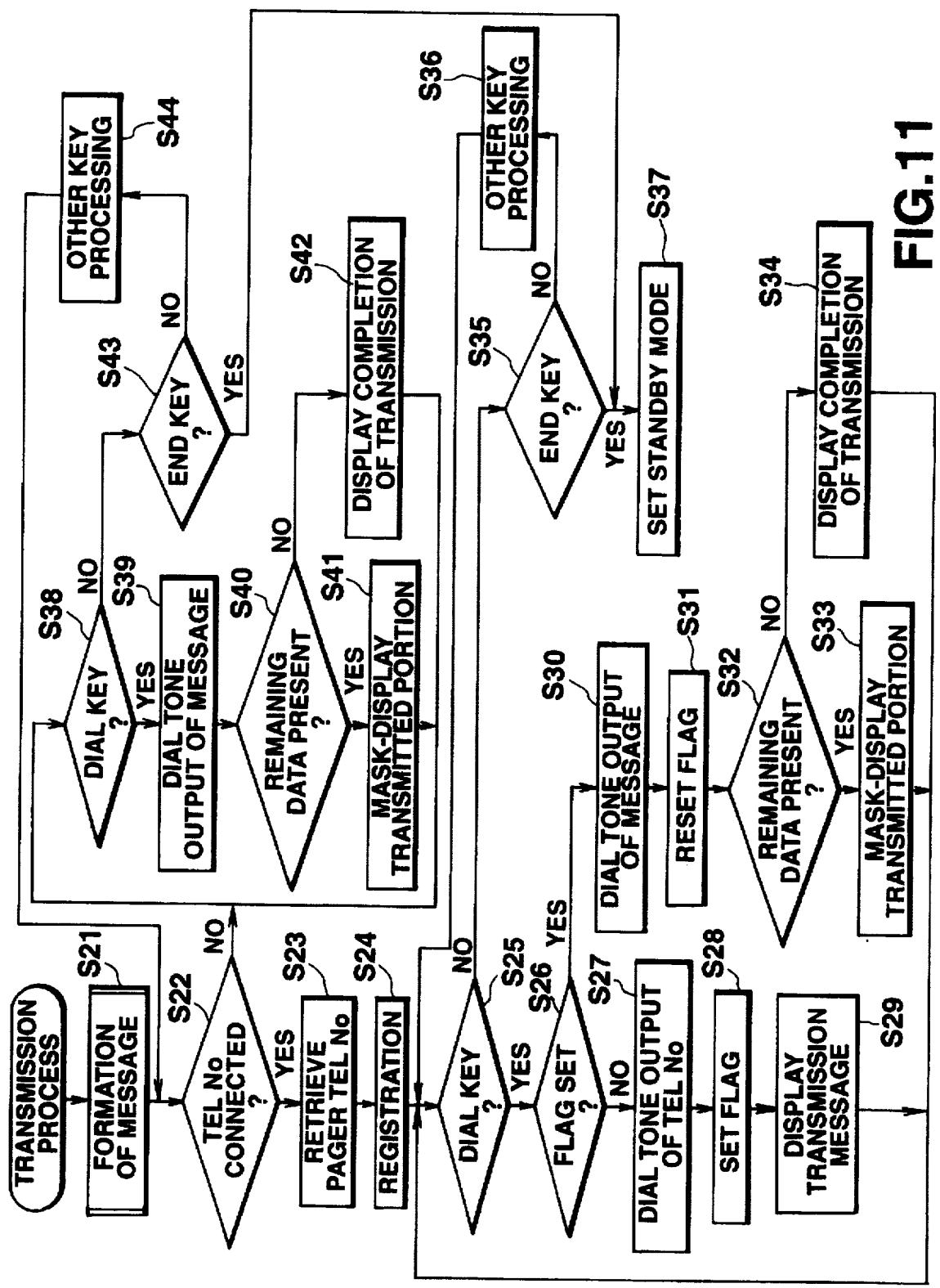
FIG. 11 is a flowchart illustrating a transmission process executed by the electronic device according to the first embodiment.

The transmission process is explained with reference to the flowchart shown in FIG. 11 and the display transition diagram shown in FIGS. 12, 13.

After the input process of the transmission message is completed, whether or not the connection key 36d for connecting the input free message to the called pager telephone number is operated in the display state (step S21) of the free message shown in (h) of FIG. 10 is determined (step S22). If the connection key 36d is operated, the pager identification information "P" previously stored in the TEL bank memory 54 and explained with reference to FIG. 8 is retrieved (step S23), a corresponding telephone number (call number of the pager) is registered into the called pager data storing portion 53a in the message memory 53 (step S24) and displayed on the display section 61 as shown in (a) of FIG. 12. Further, if the cursor key 36b is operated in this state, the pager identification information "P" which is next registered is retrieved and a corresponding telephone number is registered into the called pager data storing portion 53a instead of the previously registered telephone number and displayed on the display section 61 as shown in (b) of FIG. 12.

Figure 12:
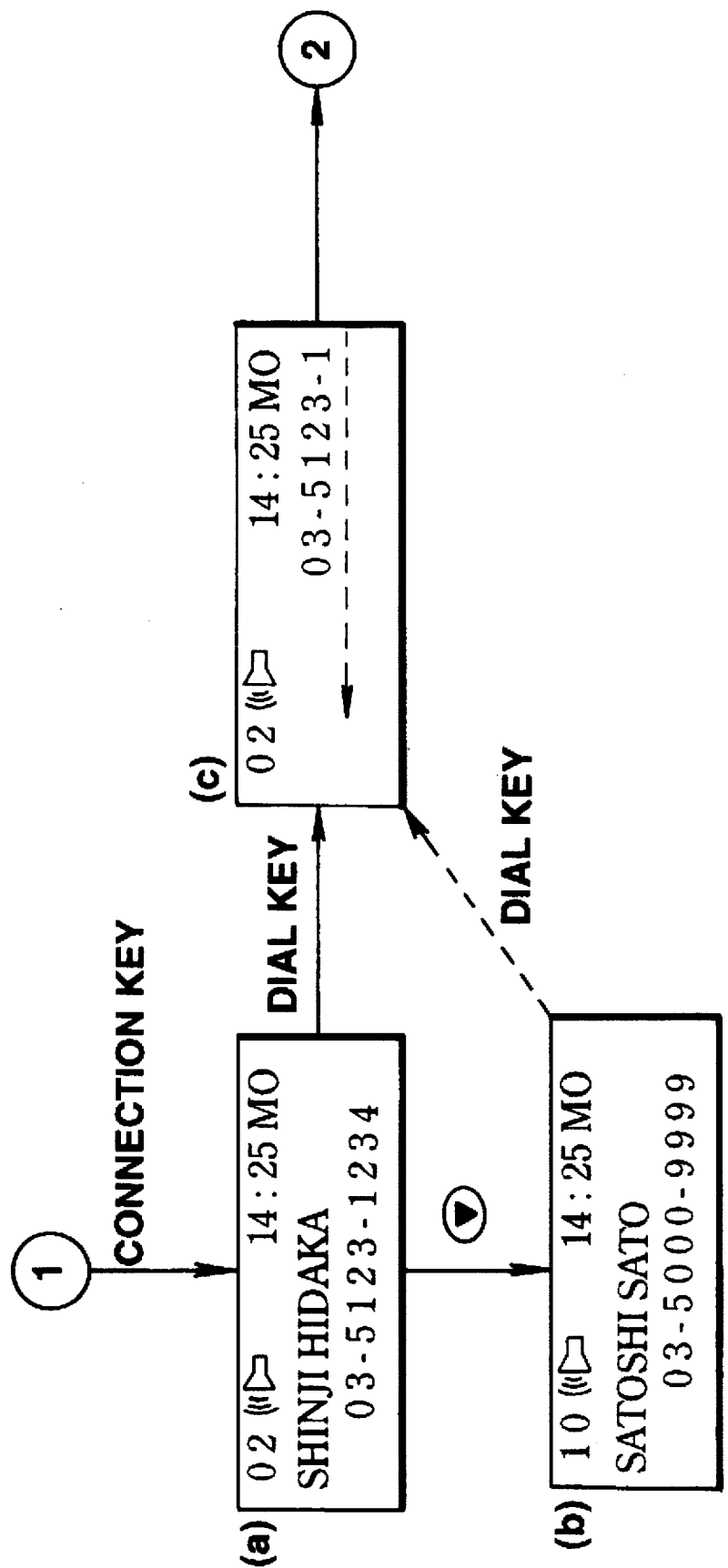
FIG. 12 is a diagram showing an example of display change state on a display 61 effected by the transmission process in FIG. 11.

The display states of (a), (b) in FIG. 12 indicate states in which the shortened number, name and telephone number of the retrieved pager are displayed together with the present time and day of the week.

Next, whether the dial key 39 is operated or not is determined (step S25). The operation of the dial key 39 is effected while the sound generation holes of the speaker 56 formed in the main body portion 22 of the electronic device 21 of this embodiment are applied to the transmitter of the handset of the push-phone. If it is determined in the step S25 that the dial key 39 is operated, whether a flag for determining whether it is the transmission message or not is set or not is determined (step S26). At the time of initial transmission, since the flag is not set, telephone number data of the pager registered in the called pager data storing portion 53a is output to the tone signal generator 55, converted into a DTMF signal and output from the speaker 56 (step S27). At this time, the process in which the telephone number data is converted into the DTMF signal is displayed on the display section 61 as shown in (c) of FIG. 12.

Figure 13:
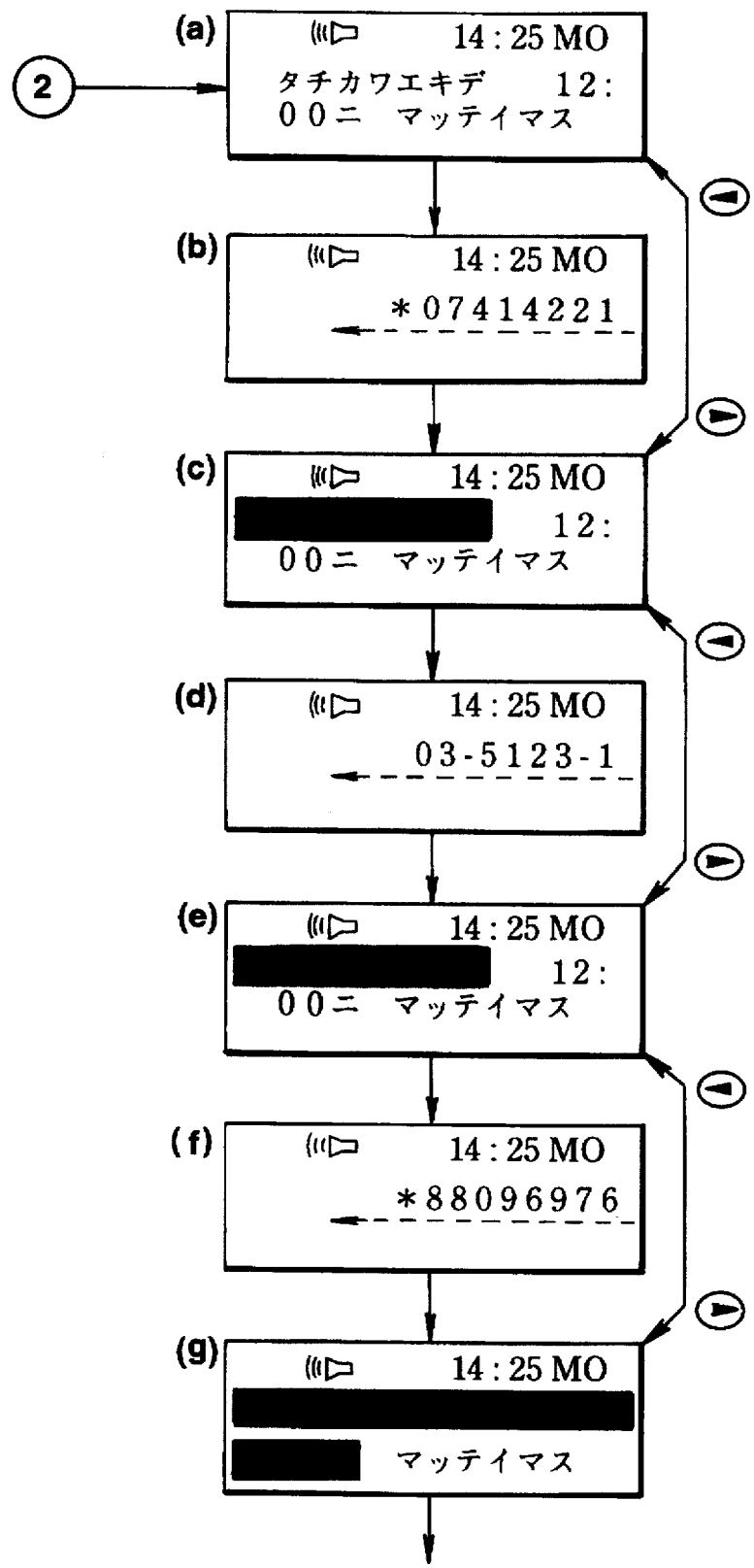
FIG. 13 is a diagram showing an example of display change state on a display 61 effected by the transmission process in FIG. 11.

Next, the message transmission flag is set (step S28) and the content stored in the latest input message information storing portion 53b in the message memory 53, that is, the transmission message is output to the display buffer 60 and displayed on the liquid crystal display section 61 as shown in (a) of FIG. 13 (step S29), and then the process is returned to the step S25. At this time, if the dial key 39 is operated again, the dial tone output of the transmission message is effected since the flag is set (step S26). In this case, whether or not the number of remaining characters of the transmission message is not less than ten is determined, and if it is not less than ten, the dial tone output of 8 characters is effected, and if it is less than ten, the dial tone output of all of the remaining characters is effected. In this example, since it is not less than ten, data of 8 characters ("ｼﾞｬﾝﾌﾞｴｷﾃﾞ" in the drawing) of the transmission message displayed on the display section 61 is converted into numeric data, and after 3-digit numeric data "*07" indicating the free message code "U7" is attached to the head portion thereof and 2-digit numeric data "*2" indicating the connection code "-" and numeric data "#" indicating the termination of the message transmission are attached to the end portion thereof, the thus obtained data is output to the tone signal generator 55, converted into a DTMF signal and output from the speaker 56 (step S30), and the process in which the transmission message data is converted into the DTMF signal is displayed on the display section 61 as shown in (b) of FIG. 13.

Next, the flag is reset (step S31) and whether the remaining portion of the transmission message to be transmitted is present or not is determined (step S32). If the remaining portion of the transmission message to be transmitted is present, the transmission message of transmitted 8 characters "ｼﾞｬﾝﾌﾞｴｷﾃﾞ" is mask-displayed as shown in (c) of FIG. 13 (step S33) and the process is returned to the step S25.

At this time, the telephone is first cut, the handset of the push-phone is picked up again, and then the dial key 39 is operated for the next transmission.

When the dial key 39 is operated, since the flag is reset (step S26), pager telephone number data of the same pager as in the case of former transmission is output to the tone signal generator 55, converted into a DTMF signal and output from the speaker 56 (step S27), and the process in which the telephone number data is converted into the DTMF signal is displayed on the display section 61 as shown in (d) of FIG. 13. After this, the image plane is returned to the original message display image plane as shown in (e) of FIG. 13. When the dial key 39 is operated, since the flag is set (step S26), data of the next 8 characters ("12:00 _" in the drawing) of the transmission message displayed on the display section 61 is converted into numeric data, 3-digit numeric data "*87" expressing a code "_7" (where the under bar indicates a space) indicating that it is the following part of the free message is attached to the head portion thereof and 2-digit numeric data "*2" indicating the connection code "-" and numeric data "#" indicating the termination of the message transmission are attached to the end portion thereof, the thus obtained data is output to the tone signal generator 55, converted into a DTMF signal and output from the speaker 56 (step S30), and the process in which the transmission message data is converted into the DTMF signal is displayed on the display section 61 as shown in (f) of FIG. 13.

Next, the flag is reset again (step S31) and whether the remaining portion of the transmission message to be transmitted is present or not is determined (step S32). When the remaining portion of the transmission message to be transmitted is present, the transmission message of transmitted 8 characters "ｲｼﾞｭ=TEL" is mask-displayed as shown in (g) of FIG. 13 (step S33) and the process is returned to the step S35.

Next, the steps S25 to S33 are repeatedly effected in the same manner as described above. When the remaining portion of the transmission message to be transmitted is no more present and this is detected in the step S32, completion of transmission is displayed on the display section 61 (step S34) and the process is returned to the step S25.

On the other hand, when it is detected in the step S25 that the operated key is not the dial key 39, whether the end key 37 is operated or not is determined (step S35), and if it is detected that the end key 37 is not operated, a process corresponding to another key operation is effected (step S36), and then the process is returned to the step S25. As the other key processing in the step S36, a process for switching the image plane displaying the transmission message may be effected. For example, when the cursor key 36d is operated, the image plane is switched to a next image plane as shown in FIG. 13, and when the cursor key 36c is operated, the image plane is switched to an immediately preceding image plane. When the end key 37 is operated, the dial transmission mode is reset and the normal reception standby mode is set (step S37).

When it is determined in the step S22 that the operated key is not the connection key 36d, that is, when the input free message is not connected to the pager telephone number of the called pager, whether the dial key 39 is operated or not is determined (step S38). When the dial key 39 is operated, transmission message data registered in the latest input message information storing portion 53b in the message memory 53 is read out in the step S21 and the same dial tone output as that in the step S30 is effected. For example, the transmission message data is "10:30 = ﾊｲｼｬ=TEL ｼﾞｭｼﾞｭﾂ (Please telephone the corporation at 10:30)", character data of the first 8 characters is converted into numeric data and "*7" is attached to the head portion thereof and "*2" and "#" are attached to the end portion thereof, and the thus obtained data is output to the tone signal generator 55, converted into a DTMF signal and output from the speaker 56 (step S39).

Figure 14:
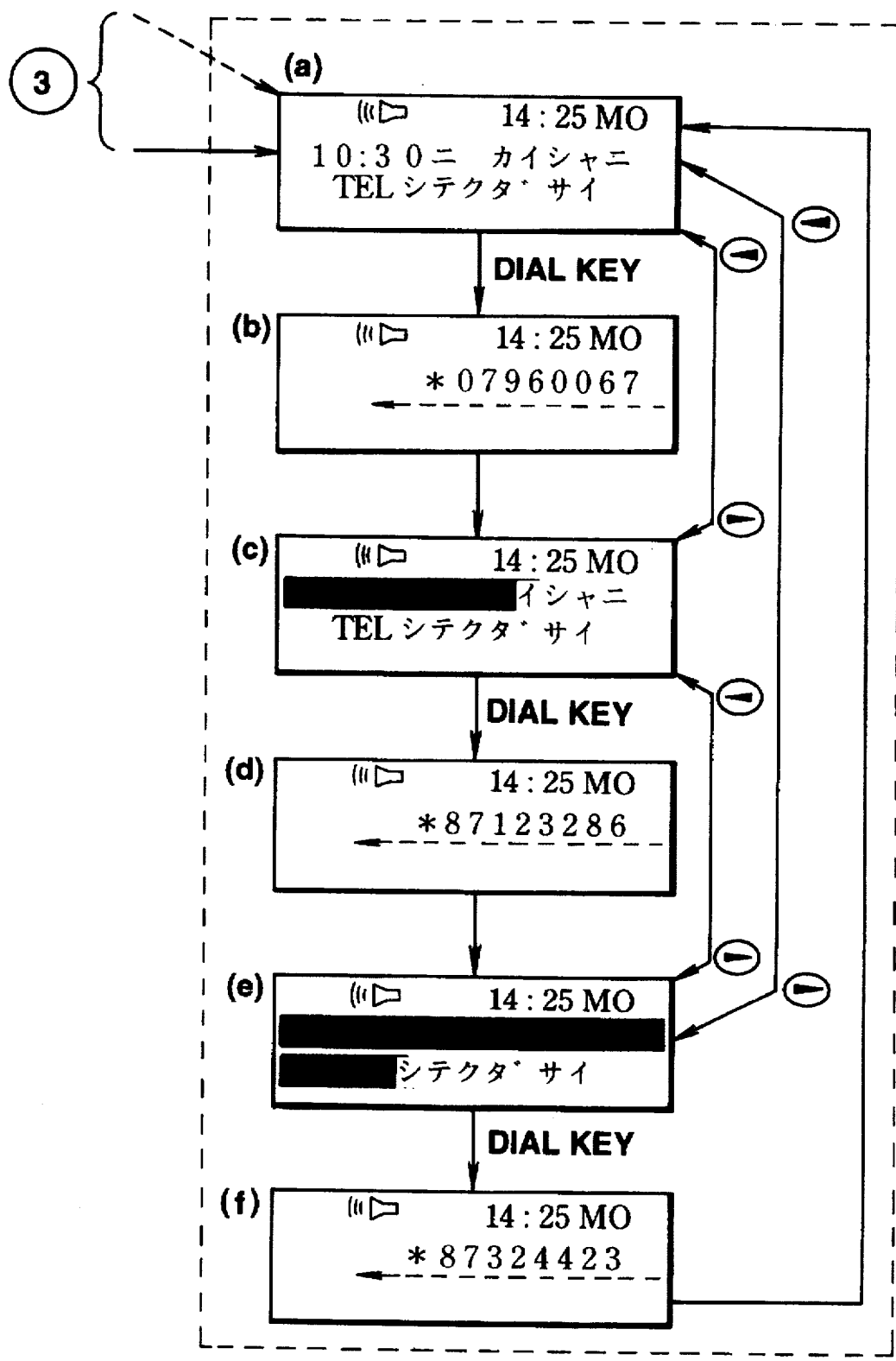
FIG. 14 is a diagram showing an example of display change state on a display 61 effected by the transmission process in FIG. 11.

At this time, the transmission message is displayed on the display section 61 as shown in (a), (b) of FIG. 14 and the tone conversion process is displayed.

Next, whether the remaining portion of the transmission message to be transmitted is present or not is determined (step S40), and when the remaining portion of the transmission message to be transmitted is present, data of the transmitted 8 characters is mask-displayed as shown in (c) of FIG. 14 (step S41), and the process is returned to the step S38. If the dial key 39 is operated again, character data of the next 8 characters is converted into numeric data and "*87" is attached to the head portion thereof and "*2" and "#" are attached to the end portion thereof, and the thus obtained data is output to the tone signal generator 55, converted into a DTMF signal and output from the speaker 56 (step S39), and the tone conversion process is displayed on the display section 61 as shown in (d) of FIG. 14. Next, if the remaining portion of the transmission message to be transmitted is still present, data of the next 8 characters is mask-displayed as shown in (f) of FIG. 14 (step S41), and if the remaining portion of the transmission message to be transmitted is no more present, completion of transmission is displayed (step S42) and the process is returned to the step S38.

When it is detected in the step S38 that the dial key 39 is not operated, whether the end key 37 is operated or not is determined (step S43), and if the end key 37 is not operated, a process corresponding to another key operation is effected (step S44) and the process is returned to the step S22. In the other key processing of the step S44, the same image plane switching operation as that in the step S36 is effected by operation of the cursor key 36c, 36d as shown in FIG. 14. When the end key 37 is operated, the dial transmission mode is reset and the normal reception standby mode is set (step S37).

In the transmission process in which the telephone number of the pager is not connected to the message, the user first specifies the destination pager and at the same time calls the paging center by effecting a series of key operations when making a call to the paging center by use of a push-phone, dial type telephone or the like, and then effects the transmission process of free message by output of the tone signal in response to the calling response of the paging center.

Each time the telephone number and message data of the pager are transmitted as described above, the paging center 1 transmits message data and an ID code corresponding to the call number of the pager to the radio base stations 7 to 9 and causes the radio base stations to transmit call signals shown in FIG. 15.

In this case, the data structure of message data in the above call signal is shown in FIG. 16. FIG. 16A shows the data structure of 8 characters first transmitted when the free message "10:30= カイシャ= TEL シヨクバ" whose construction character number is 23 is dividedly transmitted, a free message code "U7" indicating that the data is a free message is set in the first two digits, numeric data corresponding to character data of 8 characters is set in the 16 digits following the free message code, and a connection code "-" indicating that free message data to be continuously transmitted is present is attached to the end portion of the numeric data.

FIG. 16B shows the data structure of 8 characters secondly transmitted, a continuing code "_7" (the under bar in the drawing indicates a space) indicating that data is the free message data following the connection code "-" attached to the first stage is set in the first two digits, numeric data corresponding to character data of 8 characters is set in the 16 digits following the continuing code, and a connection code "-" indicating that free message data to be continuously transmitted is present is attached to the end portion of the numeric data.

FIG. 16C shows the structure of free message data of 7 characters thirdly transmitted, a continuing code "_7" indicating that data is the free message data following the connection code "-" attached to the first stage is set in the first two digits thereof and numeric data corresponding to character data of 7 characters is set in the 14 digits following the continuing code. Since no free message data following the numeric data is not present, the connection code is not attached. By attaching no connection code, completion of connection of the message is indicated.

FIG. 16D shows the data structure of a free message "アイシテル ヨシヲ (I love you; Yoshiwo)" whose construction character number is 9 and which can be transmitted in one transmission cycle, a free message code "U7" indicating that data is the free message is attached to the head portion thereof, and numeric data corresponding to character data of 9 characters is set in the 18 digits following the free message code.

As described above, in the electronic device of this embodiment, in case where a free message of a data amount larger than the data transmission amount (corresponding to 20 digits) permitted by the paging system used as the data communication system is transmitted to a destination pager, it becomes possible to clearly indicate the message amount transmitted in one transmission cycle to the user since tenth and succeeding characters are mask-displayed in the process of inputting the free message.

Further, since a call to the destination pager is automatically made simply by operating the dial key 39 each time the transmitting of transmission message in the unit of 8 characters is completed in a case wherein the telephone number of the destination pager and the transmission message are connected and dividedly transmitted, it is not necessary to effect the dialing operation of the telephone number of the destination pager on the transmission side each time the free message to be dividedly transmitted is transmitted, and the operability at the time of transmitting the free message can be improved.

Further, since a portion of the transmission message which has been transmitted in the unit of 8 characters is mask-displayed and the continuing code and connection code which are the connecting information indicating the connecting relation of free message data dividedly transmitted are attached and transmitted, the troublesome operation of reversing the order of the message portions dividedly transmitted before transmission can be omitted on the transmission side and the transmission process on the transmission side can be simplified.

Figure 17:
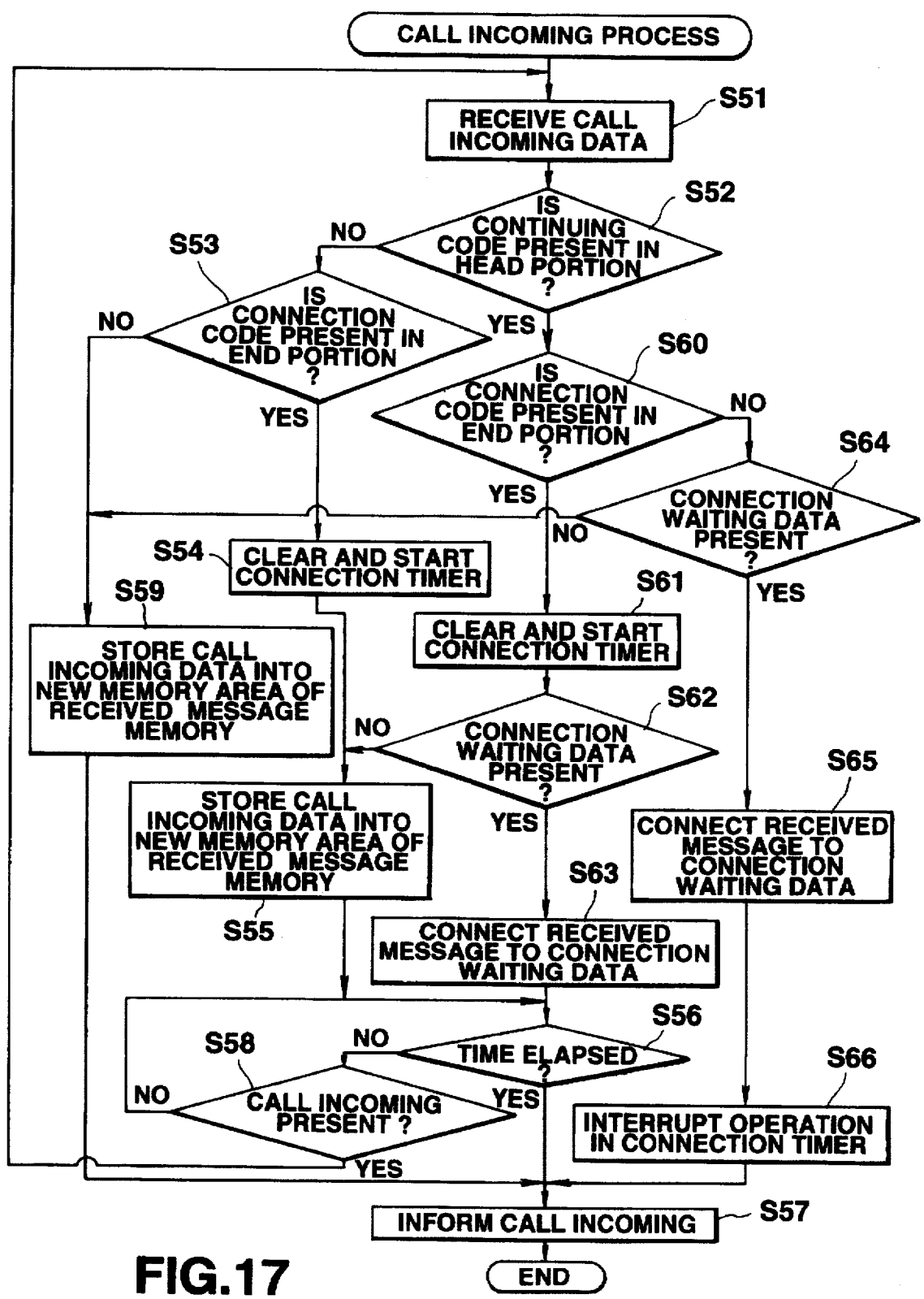
FIG. 17 is a flowchart illustrating a call incoming process executed by the electronic device according to the first embodiment.

Next, the operation of the electronic device 21 of this embodiment used as a reception device is explained with reference to the flowchart shown in FIG. 17.

If the ID code of a call signal received via the antenna 41 and receiver circuit 42 is detected to be its own ID code by the decoder 43 and the result of detection is informed to the CPU 46, the CPU 46 starts the call incoming data processing, receives the call incoming data (call incoming message data) decoded by the decoder 43 and input (step S51) and checks whether or not the continuing code is attached to the head portion of the call incoming data (step S52). That is, if the calling ID code of the transmission data coincides with its own inherent ID code stored in the ID-ROM 44, transmission data following the calling ID code is stored in the reception buffer 50 and then whether or not "7" is present in the head portion of the free message data shown in FIG. 15 is determined.

If the continuing code is not present in the head portion, whether the connection code "-" is attached to the end portion or not is checked (step S53). When the connection code "-" is attached, that is, when the received message data is data shown in FIG. 16A, the connection timer in the CPU 46 is reset and started (step S54) and the received message data is stored into the memory bank Mi1 (i is one of 1 to n) of the received message memory 51 shown in FIG. 6 in which no data is stored (step S55). Then, whether the time set by the connection timer has elapsed or not is determined (step S56). If the set time has elapsed, the operation of waiting for reception of succeeding message data to be connected is interrupted, a call incoming informing signal is output to the informing signal generator 57 to cause the speaker 58 to output an informing sound (step S57) and the process is terminated. When the time set by the connection timer has not elapsed, whether the call incoming is present or not is checked (step S58). If there is no call incoming, the process is returned to the time-up determining process of the step S56, and when the call incoming is present, the process is returned to the call incoming data fetching process of the step S51.

When it is detected in the step S53 that the connection code "-" is not attached to the end portion, that is, when the received message data is data shown in FIG. 16D, the received message data is stored into the memory bank Mj1 (j is one of 1 to n) of the received message memory 51 in which no data is stored (step S59). Then, the call incoming signal is output to the informing signal generator 57 to cause the speaker 58 to output an informing sound (step S57) and the process is completed.

Further, if it is detected in the step S52 that the continuing code "7" is attached to the head portion of the received message data, whether the connection code "-" is attached to the end portion thereof is checked (step S60), and if the connection code "-" is attached, that is, when the received message data is data shown in FIG. 16B, the time counting operation of the connection timer is started (step S61). Next, whether connection waiting data having a connection code attached to the end portion thereof which is not yet connected is present in the received message memory 51 or not is checked (step S62), that is, whether or not the data is message data following the message data which is previously received and stored in one of the memory banks M11 to Mn3 in the received message memory 51 is determined. When no connection waiting data is present, the data is stored into a different new available memory bank Mk1 (k is one of 1 to n) in the step S55, and when the connection waiting data is present, the message data received in this cycle is stored into a connection message storing memory bank (for example, Mi2) which follows the memory bank (for example, Mi1) storing the message data previously received and is connected to the previously received message (step S63).

Next, whether the time set by the connection timer has elapsed or not is determined (step S56), and if the time has elapsed, the operation of waiting for reception of succeeding message data to be connected is interrupted, a call incoming informing signal is output to the informing signal generator 57 to cause the speaker 58 to output an informing sound (step S57) and the process is completed. When the time set by the connection timer has not elapsed, whether the call incoming is present or not is checked (step S58). If there is no call incoming, the process is returned to the time-up determining process of the step S56, and when the call incoming is present, the process is returned to the call incoming data fetching process of the step S51.

When it is detected in the step S60 that the connection code "-" is not attached to the end portion, that is, when the received message data is data shown in FIG. 16C, whether connection waiting data having a connection code attached to the end portion thereof which is not yet connected is present in the received message memory 51 or not is checked (step S62), that is, whether or not the data is message data following the message data which is previously received and stored in one of the memory banks M11 to Mn3 in the received message memory 51 is determined. When no connection waiting data is present, the data is stored into a different new available memory bank M11 (l is one of 1 to n) in the step S59, and when the connection waiting data is present, the message data received in this cycle is stored into a connection message storing memory bank (for example, Mi3) which follows the memory bank (for example, Mi2) storing the message data previously received and is connected to the previously received message (step S65).

Next, whether the time counting operation of the connection timer is interrupted (step S66), a call incoming informing signal is output to the informing signal generator 57 to cause the speaker 58 to output an informing sound (step S57) and the process is terminated.

By the call incoming process described above, since a plurality of message data items dividedly transmitted are stored in the memory banks Mi1, Mi2, Mi3 (i is one of 1 to n) of the same group in the received message memory 51 and connected together based on the connection information attached thereto, they are displayed in the correct order on the display section 61 unlike the conventional case wherein they are displayed in the reverse order.

As described above, when the call incoming process for messages dividedly transmitted is effected, information is not generated at each time of reception of the message, but is generated at the completion time of reception of all of the messages, and since the dividedly received messages are stored and displayed in the correct order according to the connection information, occurrence of an annoying condition that the informing sound is generated at each time of reception of the message can be prevented and the content of the message can be easily recognized.

In the above embodiment, a case wherein the transmission message is a free message is explained, but the message can be processed in the same manner as described above when the message is a normal message constructed only by numeric data. In this case, the connection code and continuing code may be defined by a combination of symbol data items which are not generally used as the message. For example, as shown in FIG. 2, a series of two symbol data items of "[" may be used as the connection code and a series of two symbol data items of "]" may be used as the continuing code. FIG. 18A, B and C respectively show the structures of data to be first transmitted, data to be secondly transmitted and data to be thirdly transmitted when message data is dividedly transmitted by use of the thus defined connection code and continuing code.

(Second Embodiment)

Next, a second embodiment of the present invention is explained with reference to FIGS. 19 to 23. This second embodiment is so constructed that, when a transmitter dividedly transmits message, the messages to which information for identifying the transmitter is attached are then transmitted and that, when received message is one of dividedly transmitted messages, a receiver can connect the received message to other messages transmitted dividedly from the same transmitter, based on the transmitter identification information attached to the message. Like the first embodiment, in the second embodiment, the message transmitting device and message receiving device are explained by using an electronic device having the tone dialer function and pager function as an example.

Figure 19:
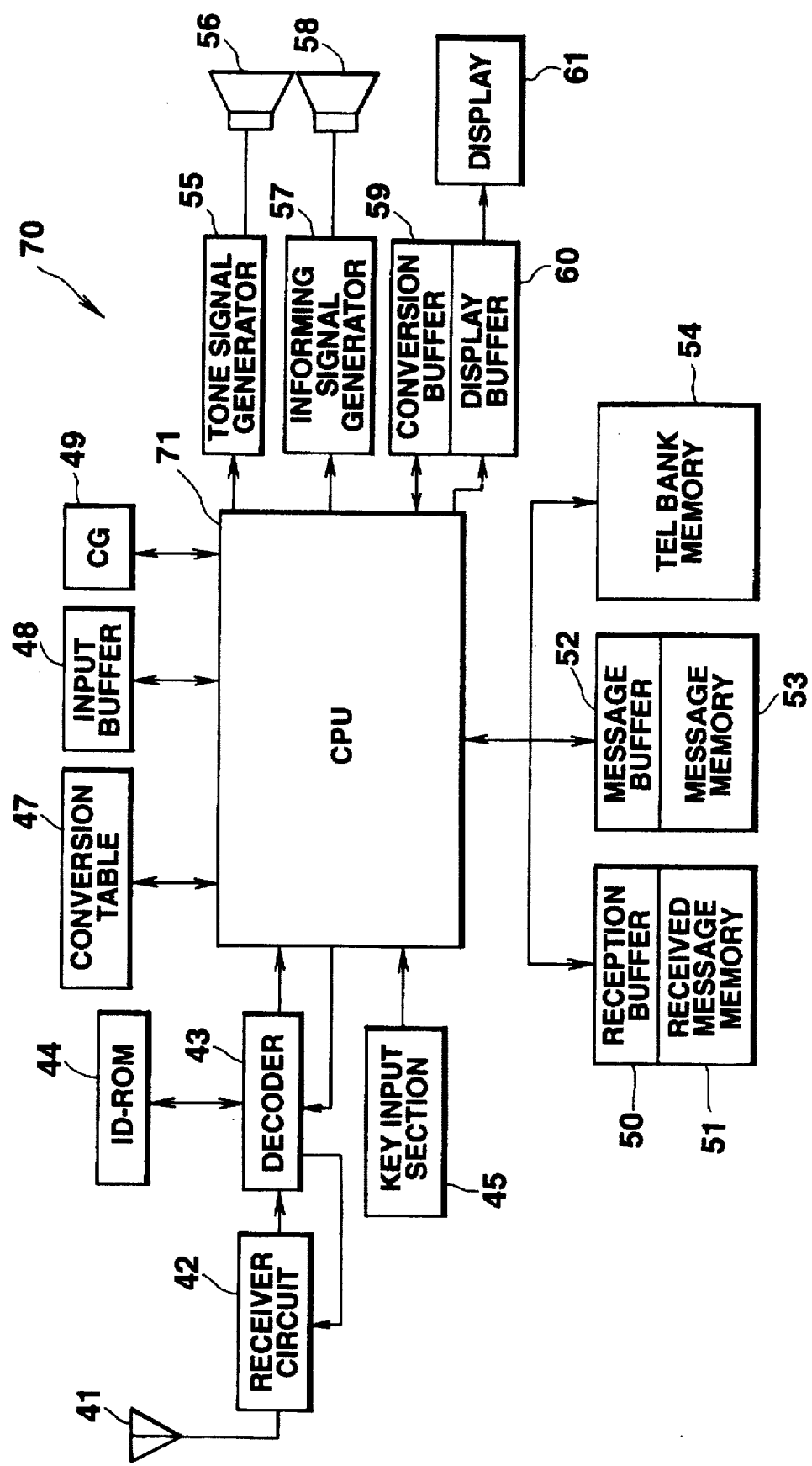
FIG. 19 is a block diagram showing a structure of the electronic device according to the second embodiment to which the present invention is applied.

FIG. 19 is a block construction diagram of an electronic device 70 of the second embodiment. In FIG. 19, a numeral 71 is a CPU which has a ROM for storing various control programs, a RAM, a timer, a register etc. therein. The ROM stores a program for executing a transmitter identifying information setting process (described later with reference to FIG. 20) for setting transmitter identifying information to be attached to the transmission message, in addition to a program for executing an input process for transmission message described as a control program for the transmitting device with reference to FIG. 9, a program for executing a transmission process described with reference to FIG. 11, and the like. The ROM stores a program for executing a reception process (described later with reference to FIG. 21) for connecting the received message to other messages transmitted dividedly from the same transmitter based on the transmitter identifying information attached to the message, and a program for reading and displaying the received message stored in the received message memory in case the message transmitted as a control program for the receiver is received and the received message is one of the dividedly transmitted messages. The RAM has storage areas for storing the transmitter identifying information which is set in the transmitter identifying information setting process. If the ROM for storing the control program is composed of an EEROM, storage areas for storing the transmitter identifying information may be provided in the ROM instead of the RAM. Also the RAM has a plurality of timer areas serving as a plurality of independent connection timers so as to cope with a case wherein message data dividedly transmitted by a plurality of users are received in the same period of time.

Other structure of the electronic device 70 of the second embodiment is the same as that of the electronic device 21 of the first embodiment. Therefore, the same portions are denoted by the same reference numerals and the explanation therefor is omitted. Further, since the appearance of the electronic device 70 of the second embodiment is the same as that of the electronic device 21 of the first embodiment, the external view thereof is omitted.

Next, an operation of the electronic device 70 of the second embodiment as the transmitter will be described. In the second embodiment, the transmitter identifying information is set as initial setting information of the electronic device 70 although it can be input every time when the transmission message is input.

Figure 20:
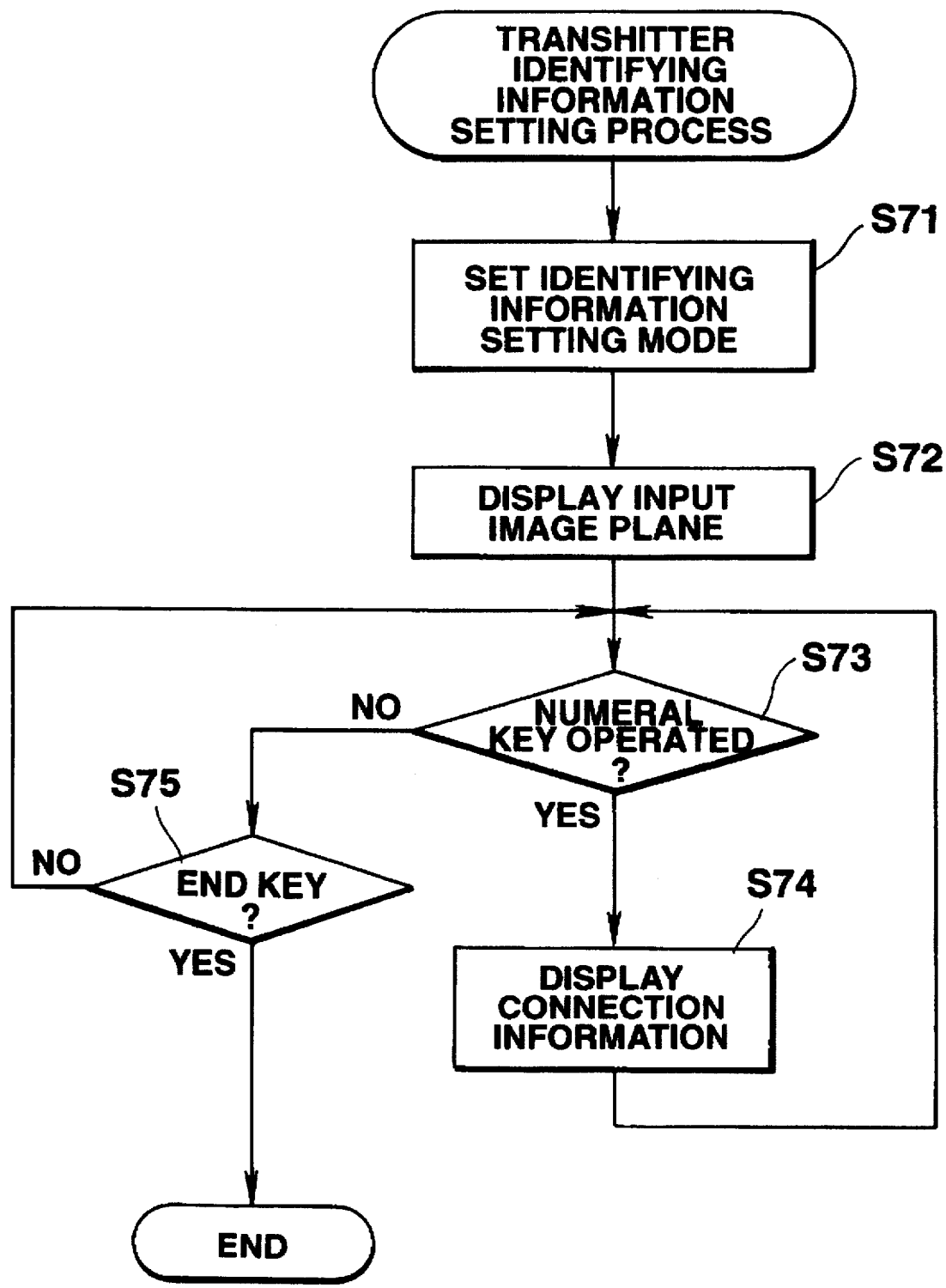
FIG. 20 is a flowchart illustrating a transmitter identification information setting process executed by the electronic device according to the second embodiment.

As shown in FIG. 20, in the transmitter identifying information setting process, first, the identifying information setting mode is set by operating the function key 30 (step S71), and an input image plane set in the identifying information setting mode is displayed on a display section 61 (step S72). Then, whether or not at least one of numeric keys 31a to 31j of the key input section 31 is operated is determined (step S73). When at least one of the numeric keys 31a to 31j is operated, the input numeric data (for example, 7) is stored in transmitter identifying information storage areas provided in the RAM in the CPU 71, and one of connection information including the transmitter identifying information is displayed (step S74). Then the process is returned to the step S73. When none of the numeric keys 31a to 31j are operated, whether the end key 37 is operated or not is determined (step S75). When the end key 37 is not operated, the process is returned to the step S73, and when the end key 37 is operated, the process is terminated.

By the above setting process, the transmitter identifying information is set, and also "U7" or "_7", for example, is set as connection information attached to the free message dividedly transmitted and is stored in the RAM in the CPU 71. In this case, a portion "7" is the transmitter identifying information. In case the numeric key 11a is operated in the above setting process, the transmitter identifying information is "3", and the connection information is "U3" or "_3".

In the electronic device 70 of the second embodiment, message transmission is performed in the same manner as that of electronic device 21 of the first embodiment. More particularly, transmission message is input by the same manner as that explained with reference to FIG. 9, and the transmission message is then transmitted to the paging center 1 by the same manner as that explained with reference to FIG. 11. The transmitter identifying information in the connection information attached to the transmission message becomes the transmitter identifying information set in the above setting process.

Then an operation of the electronic device 71 of the second embodiment as the receiver will be described with reference to a flowchart shown in FIG. 21. It is detected by the decoder 43 that ID code of the calling signal received via the antenna 41 and the receiver circuit 42 coincides with own ID code. When the CPU 71 is informed of the detection result, the CPU 71 starts call incoming process, and receives incoming data decoded and input by the decoder 43 (step S81). The CPU 71 retrieves whether the head of the incoming data is followed by the code "_+numeral" (step S82). That is, when call ID code of the transmitted data coincides with own ID code stored in the ID-ROM 44, it is determined whether the head of the received data is followed by the code after the transmitted data succeeding to the call ID code is stored in the reception buffer 50. For instance, if the free message data shown in FIG. 22A is received, the process proceeds the process in step S83 where it is detected whether the continuing code "-" is attached to the end or not since the free message data does not have the code "_+numeral" following to its head. Here, since it is determined that the continuing code "-" is attached thereto, the connection timer in the CPU 71 is started for this received message data (step S84). After a call incoming waiting time is set for succeeding messages, the message data received at this time is stored in the memory bank Mi1 (where i is any one of 1 to n) wherein data in the reception message memory 51 shown in FIG. 6 are not stored (step S85). When the connection timer is started, a label is attached to the connection timer so as to identify that which connection timer corresponds to which reception message data. As the label, the transmitter identifying information and the connection information ("U7" or "_7") including the transmitter identifying information can be utilized.

Thereafter, in order to wait for a reception of succeeding messages during the time specified by the connection timer, it is determined repeatedly whether such time is up or not (step S86) and whether the message is received or not (step S87). If the reception is detected in the step S87, the process returns to the incoming data receiving process in the step S81. If, in the step S86, it is detected that the time specified by the connection timer is up, a reception waiting operation of the succeeding message data to be connected is interrupted. The CPU 46 outputs a reception informing signal to the informing signal generator 57, and causes the speaker 58 to output a informing sound (step S88). The call incoming process is substantially completed by the call incoming informing process in the step S88. However, since there are cases where a plurality of connection timers simultaneously operate in the second embodiment, it is checked in the step S89 whether there are connection timers in operation after the call incoming informing process in the step S88. If there are some connection timers in operation, the process returns to the step S86 to detect whether the time has been elapsed or not.

Meanwhile, when the connection code "-" is not attached to the end of the message in the step S83, the received data is determined as a single message data without succeeding message data. Received message data is stored in the memory bank Mj1 (where j is any one of 1 to n) wherein data in the data reception message memory 51 are not stored (step S90). Subsequently, a reception informing signal is output to the informing signal generator 57, and a informing sound is output from the speaker 58 (step S88). This process is completed.

In the step S82, if it is determined that the continuing code is attached to the head of the received message data, then it is retrieved whether or not the connection code "-" is attached to the end thereof (step S91). For example, as shown in FIG. 22B, when the continuing code "_7" and the connection code "-" are attached to the received message data, a new connection timer for the message data is started (step S92). Then it is checked whether or not there are connection waiting data to which the free message code "U7" or the continuing code "_7" including the same identification information as the identification information "7" in the head continuing code attached to the received data is attached (step S93). Namely, it is determined whether or not the message data previously received and stored in any one of the memory banks M11 to Mn3 in the reception message memory 51 should be followed by the received data. When no connection waiting data including the same identification information can be found, this received message is stored into another new empty memory banks Mk1 (where k is any one of 1 to n) in the step S85. On the contrary, when the connection waiting data including the same identification information can be found, the message data received at this time is stored in the memory bank (for example, memory bank Mi2) for storing the connection message, succeeding to the memory bank (for example, memory bank Mi1) into which the connection waiting data are not stored (step S94). At this time, the connection timer which is started upon receiving the connection waiting data is ended.

Subsequently, the process goes to the step S86, and the above processes in the steps S86 to S89 are effected repeatedly.

If it is decided in the step S91 that the connection code "-" is not attached to the end thereof, then it is checked whether or not there are connection waiting data to which the free message code or the continuing code including the same identification information as the identification information in the head continuing code attached to the received data is attached (step S95). In other words, it is determined whether or not the message data previously received and stored in any one of the memory banks M11 to Mn3 in the reception message memory 51 should be followed by the received data. When no connection waiting data including the same identification information can be found, message data received at this time is stored into another new empty memory banks M1l (where 1 is any one of 1 to n) in the step S90. On the contrary, when the connection waiting data including the same identification information can be found, as shown in (4) of FIG. 22, the message data received at this time is stored in the memory bank (for example, memory bank Mi3) for storing the connection message, succeeding to the memory bank (for example, memory bank Mi2) into which the connection waiting data are not stored (step S96). Then the connection timer which is started upon receiving the connection waiting data is ended (step S97). The CPU 46 outputs a reception informing signal to the informing signal generator 57, and causes the speaker 58 to output a informing sound (step S88). This process is completed.

If other transmitter receives the dividedly transmitted message during waiting for the message data, for instance, if the free message data shown in FIG. 22C is received succeeding to the reception of the free message of FIG. 22B, it is determined that, in the step S82, there is no connection code at the head of the message and that, in the step S83, the connection code "_" is attached to the end of the message. When it is determined, in the step S83, that the continuing code "-" is attached thereto, the connection timer in the CPU 71 is started for the message data received at this time (step S84). After a call incoming waiting time is set for succeeding messages, the message data received at this time is stored in the memory bank Mm1 (where m is any one of 1 to n) wherein data in the reception message memory 51 shown in FIG. 6 are not stored (step S85).

Next, it is determined whether the time specified by the connection timer is elasped or not (step S86). There are two connection timers in operation at this time, i.e., one is the connection timer which is started at the time of reception of this message in the step S84, and the other is the connection timer which is started at the time of reception of the message of FIG. 22B in the step S91. If the message is received before the connection timer which is started at the time of reception of the message of FIG. 22B in the step S91, this fact is detected in the step S87 and the message data receiving process is effected in the step S81.

Here, if the received message data is the message data shown in FIG. 22D, the process proceeds to the step S95 via determination processes in the steps S82 and S91 since the continuing code "_7" is attached to the head of the message data but the connection code "-" is not attached to the end of the message data. A process is executed to determine whether or not there is connection waiting data including the same identification information. If the message data shown in FIG. 22B is stored in the memory bank Mi2 of the reception message memory 51, the process is decided as YES in the step S95 and proceeds to the step S96. The message data as the reception data at this time shown in FIG. 22D is stored in the memory bank Mi3 of the reception message memory 51 and is connected to the message data shown in FIG. 22C.

When a storing process wherein this received message is connected to the connection waiting data is completed in the step S96, the operation of the connection timer which is started when the message shown in FIG. 22B is received is interrupted in the step S97. Then the call incoming is informed in the step S87, the process returns to the time-up detection process in the step S86 and waits for a reception of the message data shown in FIG. 22E following to the message data shown in FIG. 22C.

While, in case the message data received in the step S81 is the message data shown in FIG. 22E, this message data has the continuing code "_3" at the head, but it does not have the connection code "-" at the end. Therefore, the process goes to the step S95 through determination processes in the steps S82 and S91, as in the case where the message data shown in FIG. 22D is received, and then the process is effected to determine whether or not there is connection waiting data having the same identification information. Since the message data shown in FIG. 22C is stored in the memory bank Mm1 of the reception message memory 51, as described above, the process proceeds to the step S96 after it is decided as YES in the step S95. Here, the message data shown in FIG. 22E, i.e., the message data received at this time, is stored in the memory bank Mm2 of the reception message memory 51 to be connected to the message data shown in FIG. 22C.

In the step S96, the storing process for connecting the received message to the connection waiting data is completed, and then the connection timer which is started upon receiving the message shown in FIG. 22C is stopped. Then the call incoming is informed in the step S87, and the process returns to the time-up detection process in the step S86. Here, a reception of the message data shown in FIG. 22D following to the message data shown in FIG. 22B is waited for.

According to the above call incoming process, i.e., the reception process, since the dividedly transmitted message data are stored to be connected based on the identification information attached to the free message code and the continuing code, such dividedly transmitted message data can be correctly stored and displayed as one message data.

In addition, the user is informed of call incoming when one complete message is received, instead of being informed of each reception of the dividedly transmitted message data, and the dividedly transmitted message data are stored and displayed in correct order using the connection information at every terminal in the transmitter side. Therefore, frequent occurrence of informing sounds generated at every call incoming can be prevented and the contents of the message can be easily checked by the user.

In this embodiment, the case wherein the dividedly transmitted message is composed of the free message is explained above. However, it is noted that the present invention can applicable in the same manner to the case wherein the dividedly transmitted message is composed of the normal message including only numeric data. In this case, the connection code and the continuing code shown in FIG. 18 to which a numeral of one digit for identifying the transmitter is attached, for example, may be used as the connection code and the continuing code. FIGS. 23A, B and C show respectively structures of firstly transmitted data, secondly transmitted data and thirdly transmitted data when the message data using the connection code and the continuing code as defined above are dividedly transmitted.

In this embodiment, even if the received message data is incomplete data such that the message data on and after the second message data are dividedly transmitted without storing the previously transmitted message data in the reception message memory 51, all received message data can be stored. Especially, in the call incoming process shown in FIG. 21, if the process is decided as NO in the step S93, i.e., if there is no connection waiting data having the same transmitter identification information although the received message data has the continuing code in the head portion thereof, the received message data can be stored in a new memory area of the received message memory 51 in the step S85. Also, if the process is decided as NO in the step S95, the process proceeds to the step S90 wherein the received message data can be stored in a new memory area of the received message memory 51.

However, it is noted that the received message data may be canceled if the received message data is such incomplete data. In detail, if the processes are decided as NO in the steps S93 and S95 in FIG. 21, the process goes to the step S98 wherein the received message data is canceled, as shown by a dashed line in FIG. 21, and then the process is ended.

Figure 21:
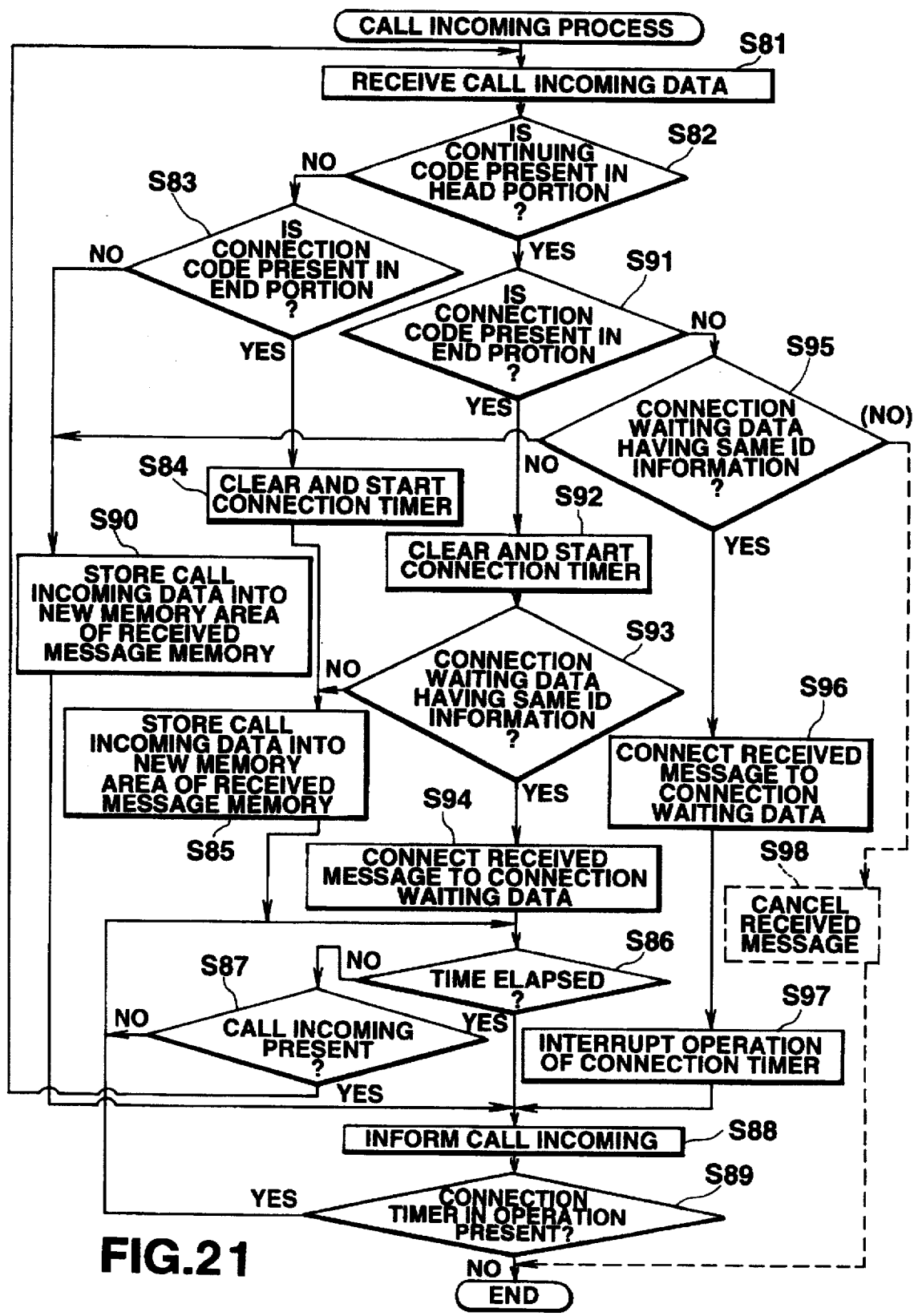
FIG. 21 is a flowchart illustrating a call incoming process executed by the electronic device according to the second embodiment.
Figure 24:
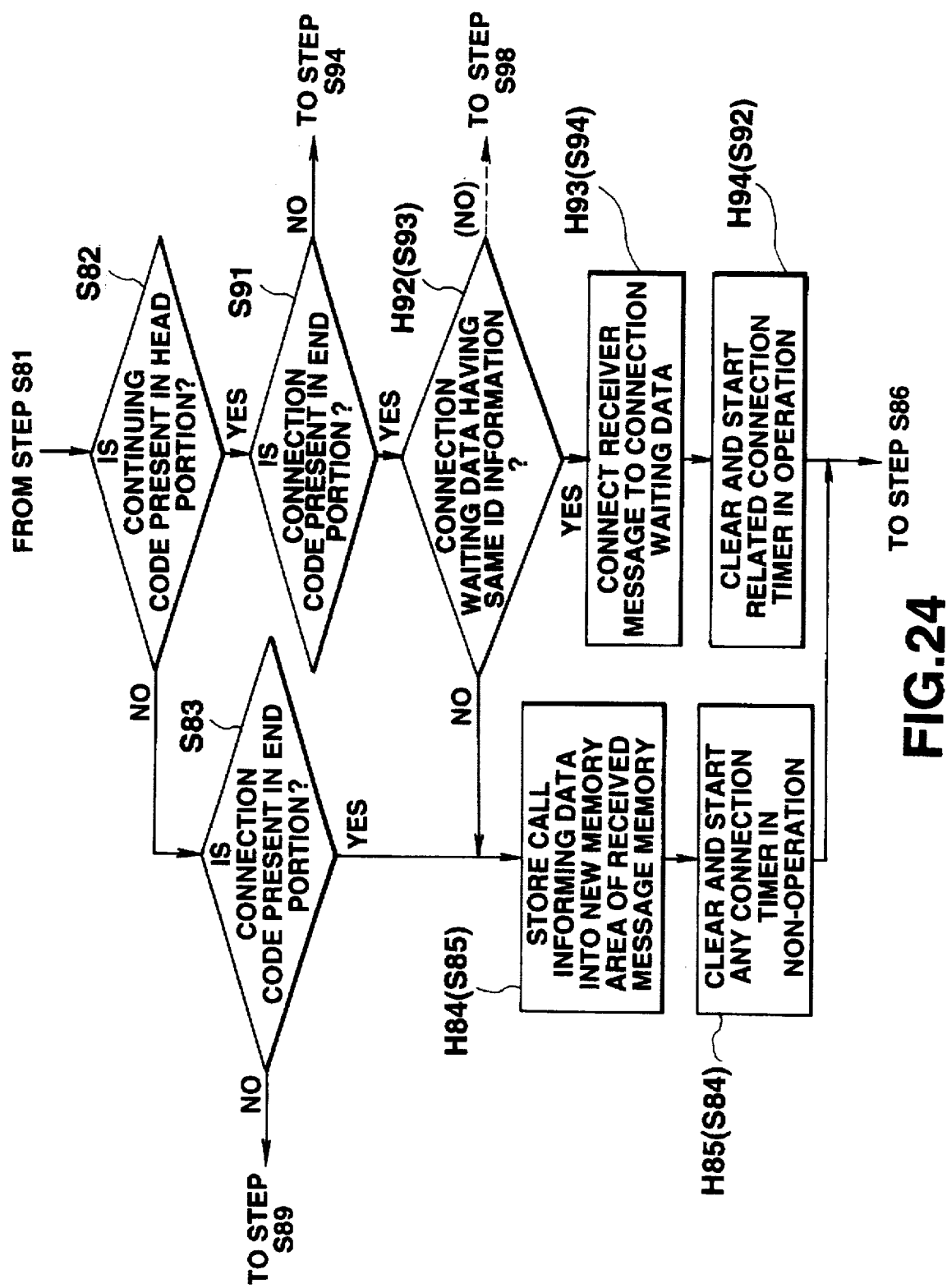
FIG. 24 is a flowchart illustrating main steps of a modification example of the call incoming process shown in FIG. 21.
Figure 25:
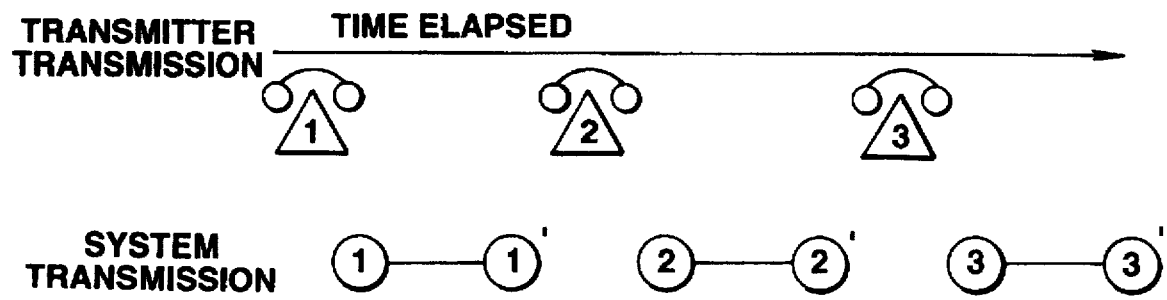
FIG. 25 is a diagram showing an example of a transmission pattern of the message data dividedly transmitted.

In this embodiment, if the received message includes the connection code in the end portion thereof, i.e., the process is decided as YES in the steps S83 and S91 in FIG. 21, the connection timer is started immediately, as described above. However, it is noted that the connection timer can be started after the received message data is stored. FIG. 24 shows the pertinent portion of process flow in this case, and the same numbers are attached to the same process steps as the process steps shown in FIG. 21.

Process flow shown in FIG. 24 will be described more concretely. IF it is determined in the step S82 that the continuing code is not attached to the head of the message and it is determined in the step S83 that the connection code is attached to the end of the message, i.e., if the received message data is such data shown in FIG. 22A, for example, first, in the step H84, the received message is stored in the memory bank (for example, memory bank Mi1) of the reception message memory 51 in which data is not stored. The connection timer for specifying the reception waiting time of the message data following to this message data, i.e., the message data shown in FIG. 22B, is started in the next step H85. In the step H85, one of the connection timers in non-operation is started selectively. As described in the call incoming process in FIG. 21, the label consisting of the free message code "U7" or the transmitter identification information "_7" is attached to this selected connection timer. Thereafter, the process goes to the time-up detection process in the step S86 to wait the reception of the message data shown in FIG. 22B, like the call incoming process in FIG. 21.

If it is determined that, in the step S82, the continuing code is attached to the head portion of the received message and, in the step S91, the connection code is attached to the end portion thereof, i.e., if the received message data corresponds to the message data shown in FIG. 22B, for example, first it is determined in the step H91 whether there is connection waiting data having the same transmitter identification information or not. In this determination, the transmitter identification information in the continuing code of this received message data is collated with the transmitter identification information having the label attached to the connection timer in operation.

If it is decided in the step H92 that there is no connection code having the same transmitter identification information, the process proceeds to the step H84 (or the step S98). On the other hand, if it is decided that there is connection code having the same transmitter identification information, the process proceeds to the step H93 wherein the received message data is connected to the connection waiting data. More particularly, in case the received message data is the message data shown in FIG. 22B, the received message data is stored in the memory bank Mi2 of the reception message memory 51 next to the memory bank Mi1 in which the message data shown in FIG. 22A has already been stored. The connection timer for specifying the reception waiting time of the message data following to this message data, i.e., the message data shown in FIG. 22C, is started in the next step H94. In the step H94, instead of starting the connection timer in non-operation as in the call incoming process in FIG. 21, the related connection timer in operation, i.e., the connection timer in operation to which the label consisting of the free message code "U7" or the transmitter identification information "_7" is attached is cleared and restarted. Therefore, in contrast to the first embodiment, the number of the connection timer can be reduced by at least one. Subsequently, the process proceeds to the time-up detection process in the step S86 wherein the reception of the message data shown in FIG. 22C is being waited, like the call incoming process in FIG. 21.

(Third Embodiment)

Next, a third embodiment of the present invention will be explained hereinafter with reference to FIGS. 25 to 29. According to the third embodiment, in a communication system so constructed that the same message is transmitted at predetermined time intervals by a plurality of times, a plurality of dividedly transmitted messages can be received while being connected correctly in the receiver side.

In a system for transmitting the message in the form of broadcasting like the communication system, especially, the radio paging system, in order to improve an incoming rate of the transmission message, there is provided a system which is constructed such that the same message is transmitted at predetermined time intervals by a plurality of times. For example, when about one minute elasped after one of the radio paging system used in Japan transmits the message input from the caller, it retransmits the same message again.

The receiver used in such communication system has a timer (cancel timer) for specifying the time intervals until the system retransmits the same message. The timer is started every time when the received message is stored into the reception message memory. If the message is received before the time specified by the timer is up, the received message is compared with stored messages. Unless they coincide with each other, the received message is stored into the reception message memory and the timer is started. If they coincide with each other, the received message is canceled. As a result, the same message is ensured not to be stored duplicatedly into the reception message memory.

When the message transmission is effected by directly operating the dial key of the push-phone 3 shown in FIG. 1 or the dial key of the portable telephone 4, it takes more than one minute to transmit the message one time. Therefore, if the message is divided into three message pieces, the radio base stations 7 to 9 transmit first to third messages 1 to 3 and retransmit first to third retransmitted messages 1' to 3' at time intervals shown in FIG. 25. Accordingly, in this case, since the receiver receives the messages transmitted from the radio base stations in an order of 1, 1', 2, 2' and 3, 3' if both the cancel timer and connection timer are used. As a result, the receiver can receive the dividedly transmitted messages 1 to 3 correctly and continuously as the messages 1, 2, 3.

When the message transmission is effected by the dialer device or the electronic device having the dialer function in the first embodiment, it takes less than one minute to transmit the message one time. Therefore, if the message is divided into three message pieces, the radio base stations 7 to 9 transmit first to third messages 1 to 3 and retransmit first to third retransmitted messages 1' to 3' at time intervals shown in FIG. 26. In this case, since the receiver receives the messages transmitted from the radio base stations in an order of 1, 2, 1', 3, 2' and 3', the message 1 and 2 are connected, the message 1' and 3 are connected and the message 2' and 3' are connected if both the cancel timer and connection timer are used simply. As a result, three messages which are completely different from the transmitted messages are stored into the reception message memory.

The third embodiment is constructed such that, even if the messages are dividedly transmitted during short time as described above, the dividedly transmitted messages can be received correctly and continuously in the receiver side. In the third embodiment, like the first embodiment, the electronic device having a tone dialer function and a pager function will be described as an example of the message transmission apparatus and the message reception apparatus.

Figure 27:
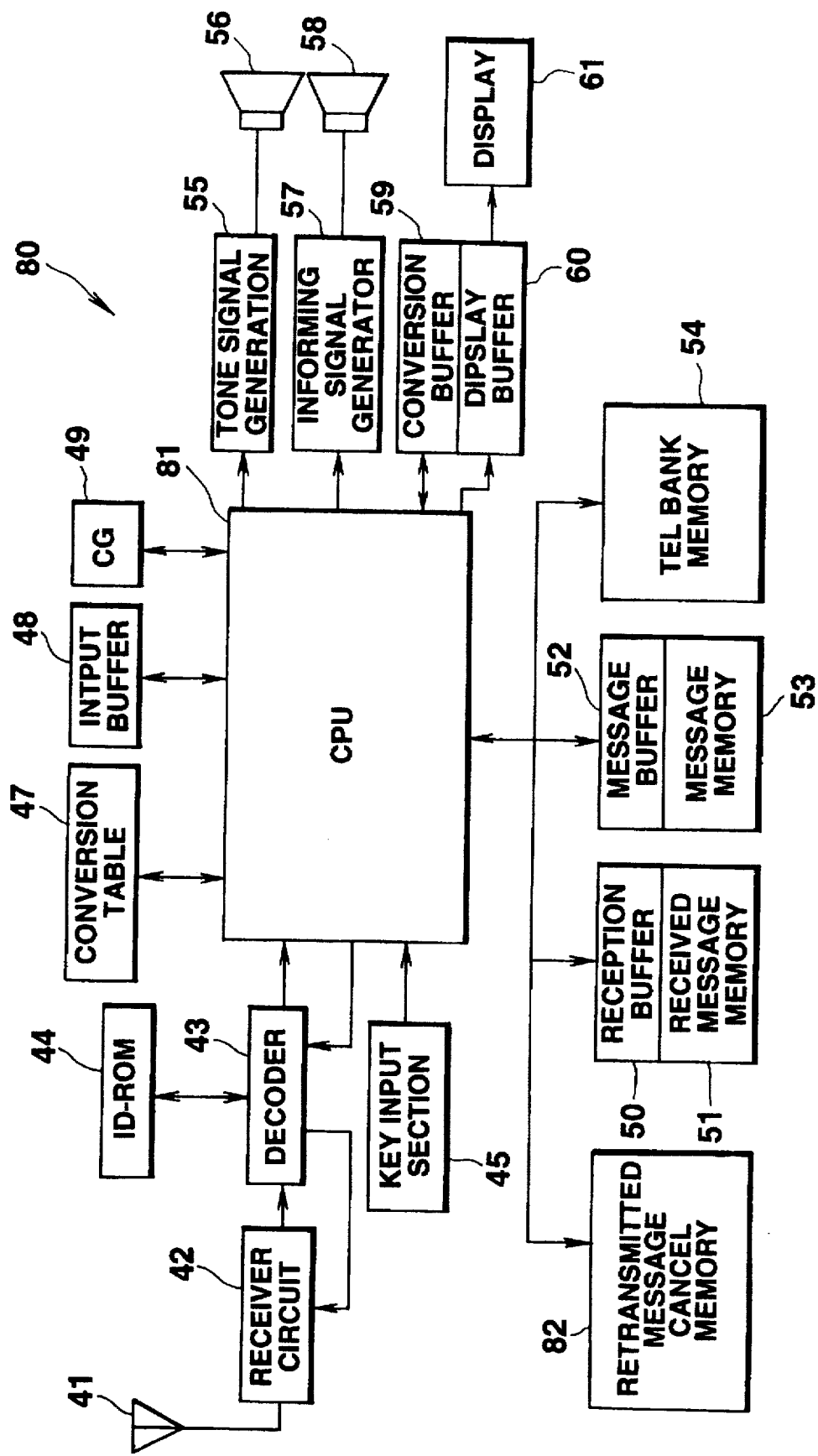
FIG. 27 is a block diagram showing a structure of the electronic device according to the third embodiment to which the present invention is applied.

FIG. 27 is a block construction diagram of an electronic device 80 of the third embodiment. In FIG. 27, a numeral 81 is a CPU which has a ROM for storing various control programs, a RAM, a timer, a register etc. therein. The ROM stores a program for executing an input process for transmission message described as a control program for the transmitting device with reference to FIG. 9, a program for executing a transmission process described with reference to FIG. 11, and the like. The ROM stores a program for executing a call incoming process described later with reference to FIG. 29, and a program for reading and displaying the received message stored in the received message memory as a control program for the receiver. Like the first embodiment, the RAM has timer areas serving as connection timers which specify the waiting time (for example, 5 minutes) for waiting for the message reception following to the received message when the message to which the connection code is attached is received. As described in the second embodiment, if the receiver receives dividedly transmitted messages from a plurality of users, timer areas for a plurality of connection timers are provided in the RAM. Further, in this embodiment, in order to prevent duplicate storing of the same message, a timer area for the cancel timer for counting about one minute is provided in the RAM. The cancel timer is the timer for the normal message which can be transmitted one time by the transmitter. The cancel timer for the dividedly transmitted message is set in the memory 82 for canceling the retransmitted message described later.

Figure 28:
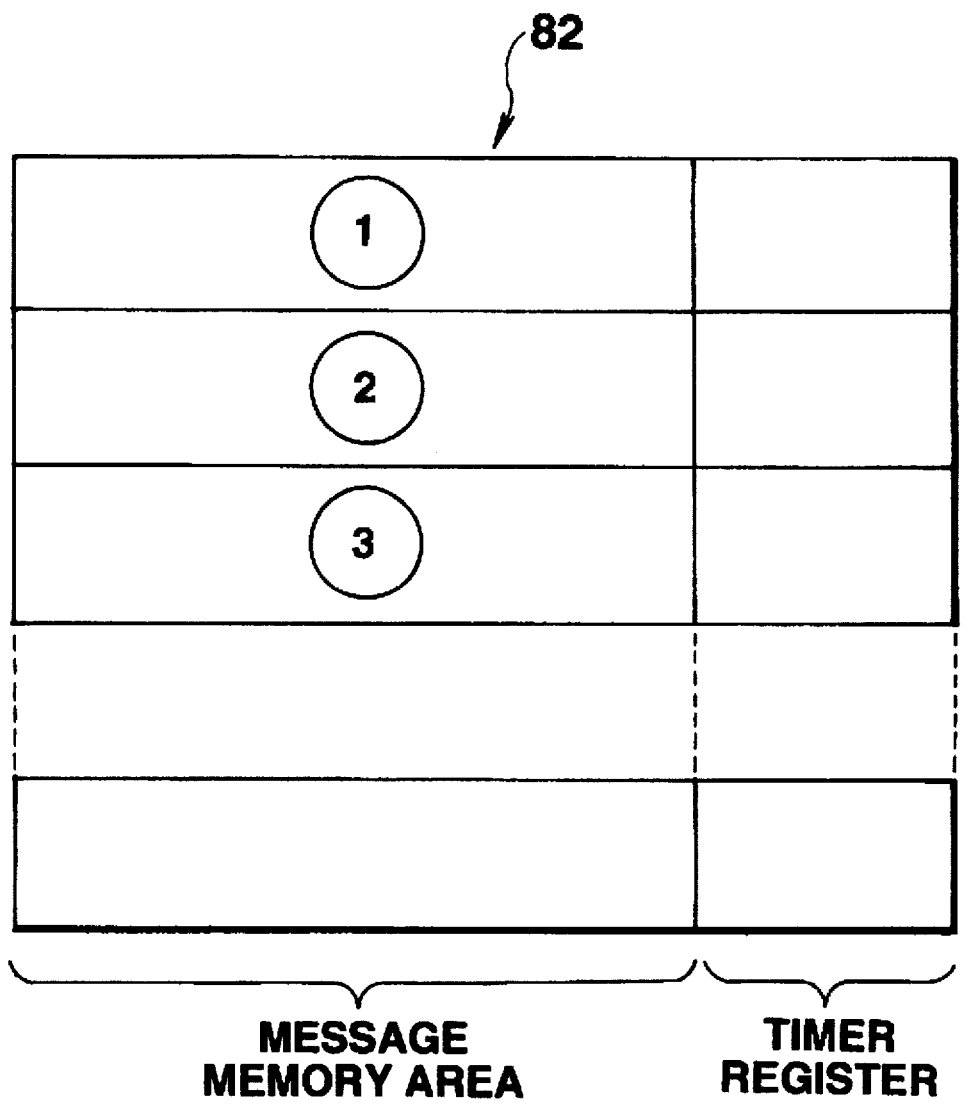
FIG. 28 is a diagram showing a structure of a retransmitted message cancel memory 82 in FIG. 27.

The retransmitted message cancel memory 82 is used to cancel the retransmitted message of the dividedly transmitted message. As shown in FIG. 28, the cancel memory 82 has a plurality of message memory areas for storing the dividedly transmitted and received messages, and a plurality of timer registers provided correspondingly to the plurality of message memory areas.

Other structure of the electronic device 80 of the third embodiment is the same as that of the electronic device 21 of the first embodiment. Therefore, the same portions are denoted by the same reference numerals and the explanation therefor is omitted. Further, since the appearance of the electronic device 80 of the third embodiment is the same as that of the electronic device 21 of the first embodiment, the external view thereof is omitted.

Figure 29:
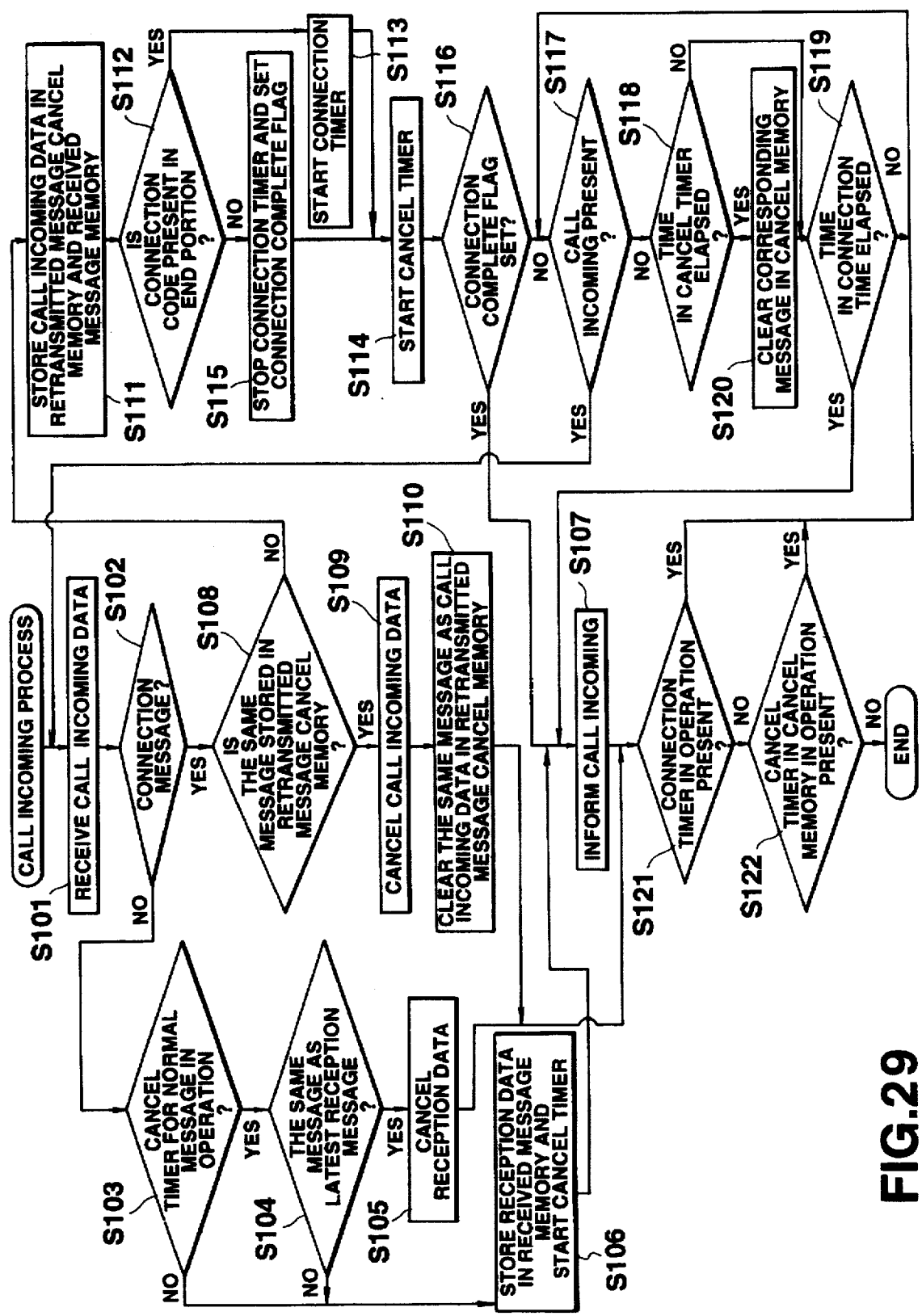
FIG. 29 is a flowchart illustrating a call incoming process executed by the electronic device according to the third embodiment.

Next, the call incoming process effected by the electronic device 80 of this embodiment will be described hereinafter with reference to the flowchart shown in FIG. 29.

It is detected by the decoder 24 that ID code of the calling signal received via the antenna 41 and the receiver circuit 42 coincides with own ID code. When the CPU 81 is informed of the detection result, the CPU 81 starts call incoming process, and receives incoming data decoded and input by the decoder 43 (step S101). The CPU 71 retrieves whether the received data includes the continuing code or the connection code and determines whether the message to be connected is received or not (step S102). Unless it is the message to be connected, the call incoming process for the normal message is effected. That is, it is determined whether the cancel timer for the normal message in the CPU 81 is in operation or not (step S103). If the timer is in operation, the received message data is compared with the latest received message stored in the reception message memory 51 (step S104). When both messages coincide with each other, the received message data is canceled (step S105). If the received message data is different from the latest received message or if the cancel timer for the normal message is in non-operation, the received message at this time is stored in the reception message memory 51, and the cancel timer for the normal message is started (step S106) and then an operation for informing the call incoming is effected (step S107).

In the step S102, if it is decided that the connection message is received, then it is checked whether the same message has been stored in the message memory areas in the retransmitted message cancel memory 82 or not (step S108). Namely, it is determined whether or not the received message data is the retransmitted message data. If the received message data is the retransmitted message data which is the same as the already stored message data, the received message data is canceled (step S109). Subsequently, the same message data which is stored in the message memory area in the retransmitted message cancel memory 82 is cleared (step S110).

At this time, the received message data is stored into any empty message memory area of the retransmitted message cancel memory 82, regardless of transmitted number in the dividedly transmitted message. However, in order to connect dividedly transmitted messages as one message, the reception message memory 51 is structured such that firstly transmitted message is stored into the memory bank Mi1 (where i is any one of 1 to n), secondly transmitted message is stored into the memory bank Mi2, and finally (thirdly) transmitted message is stored into the memory bank Mi3. In this embodiment, when the finally transmitted message is received to thus complete the connection of the message, the informing of the call incoming of the dividedly transmitted messages is effected.

Accordingly, when the storing process is completed (step S111), it is determined whether the connection code is attached to the received message data (step S112). If the connection code is attached to the received message data, the connection timer is started (step S113) and then the cancel timer is started (step S114). Unless the connection code is attached to the received message data, the connection timer is interrupted and the connection complete flag is set (step S115) and then the cancel timer is started (step S114). The cancel timer is composed of timer registers corresponding to message memory areas in the retransmitted message cancel memory 82 in which the received message data is stored in the step S111.

After the cancel timer is started in the step S114, it is determined whether the connection complete flag is set or not (step S116). If the flag is set, the call incoming is informed (step S107). If not, the decision process to determine whether the message is received or not (step S117), the decision process to determine whether the time specified by the cancel timer in the retransmitted message cancel memory 82 is up (step S118), and the decision process to determine whether the time specified by the connection timer is elapsed (step S119) are executed repeatedly.

If it is determined that the message data is received in the step S117, the process returns to the step S101 and the receiving process of the reception message data. If it is determined that the cancel timer is time-up in the step S118, the process goes to the step S120 and the corresponding message data stored in the message memory area in the retransmitted message cancel memory 82 is cleared. If it is determined that the connection timer is time-up in the step S119, the process returns to the step S107 where the call incoming is informed.

After the call incoming informing (step S107), the cancel of the received data (step S105) and the clear of the stored message (step S110) are effected, the process proceeds to the step S121 where it is determined whether there are any connection timers in operation. If YES, it is determined whether the message is received or not (step S117). If NO in the step S117, it is determined whether there are any cancel timers in the retransmitted message cancel memory 82 in operation (step S122). If YES in the step S122, the process returns to the step S117 and the process to determine whether the message is received or not is executed. If NO in the step S122, the process is ended.

Figure 26:
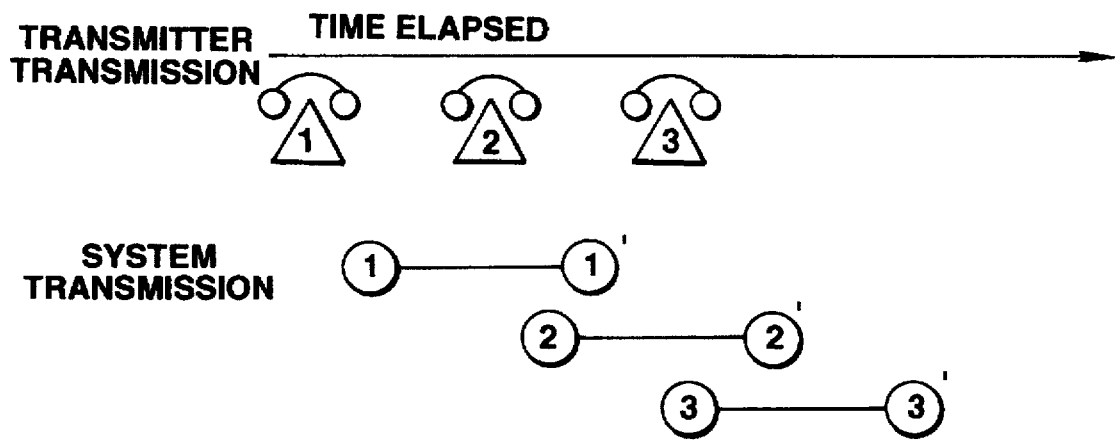
FIG. 26 is a diagram showing another example of the transmission pattern of the message data dividedly transmitted.

According to the above call incoming process, even when the electronic device 80 receives dividedly transmitted message 1 to 3 having transmitting pattern shown in FIG. 26, it can connect these messages correctly. That is, first, when the message 1 is received, the message 1 is stored into the empty memory bank Mi1 (where i is any one of 1 to n) of the reception message memory area 51 and into the empty message memory area of the retransmitted message cancel memory 82. At the same time, the connection timer is started, and the retransmitted message cancel timer is started to count using the timer register corresponding to the message memory area of the memory 82 wherein the message 1 is stored. Then, when the message 2 is received, the message 2 is stored into the connection message memory bank Mi2 succeeding to the memory bank Mi1 of the reception message memory 51 and into the empty message memory area of the memory 82. Also the connection timer is started and the counting of the cancel timer is started, as stated above.

Next, when the retransmitted message 1' is received, the retransmitted message 1' received at this time is canceled and therefore it cannot be stored in the reception message memory 51 since the message 1' is identical to the message 1 stored previously in the message memory area of the memory 82. Then, the message 3 is received, the message 3 is stored into the connection message memory bank Mi3 succeeding to the memory bank Mi2 of the reception message memory 51 and into the empty message memory area of the memory 82. Also the connection timer is started and the counting of the cancel timer is started. By receiving the message 3, the connection of these message data 1, 2 and 3 is completed in the reception message memory 51 and the call incoming is informed.

Succeeding messages 2' and 3' are received before the time specified by the cancel timer is up. However, since these messages are identical to the messages 2 and 3 stored in the retransmitted message cancel memory 82, they are canceled. Therefore, the call incoming is not informed to thus occur no problem.

Accordingly, the function of connecting the received message data, which is attached to the pager function of the electronic device 80, can be utilized, without being influenced by the transmission intervals decided by the transmitting center system and the transmitting process effected by the transmitter.

In this embodiment, canceling of the retransmitted message by using the retransmitted message cancel memory 82 is applied to only the connection message. However, it is noted that the retransmitted message cancel memory for the normal message can be provided, and thus the retransmitted message of the normal message can be canceled by operating individually the retransmitted message cancel timers.

(Fourth Embodiment)

The fourth embodiment of the present invention will be described with reference to FIGS. 30 to 33. Assuming that a plurality of enterprises supply a message transmission service using the communication system and the maximum amount of data transmitted by each enterprise once are different from each other, the fourth embodiment is so constructed that, upon inputting and transmitting the transmission message by the enterprise, an amount of data which can be transmitted once is clearly shown and that a process of divided transmission can be conducted correctly, corresponding to the service of the enterprise to which the destination terminal belongs.

Figure 30:
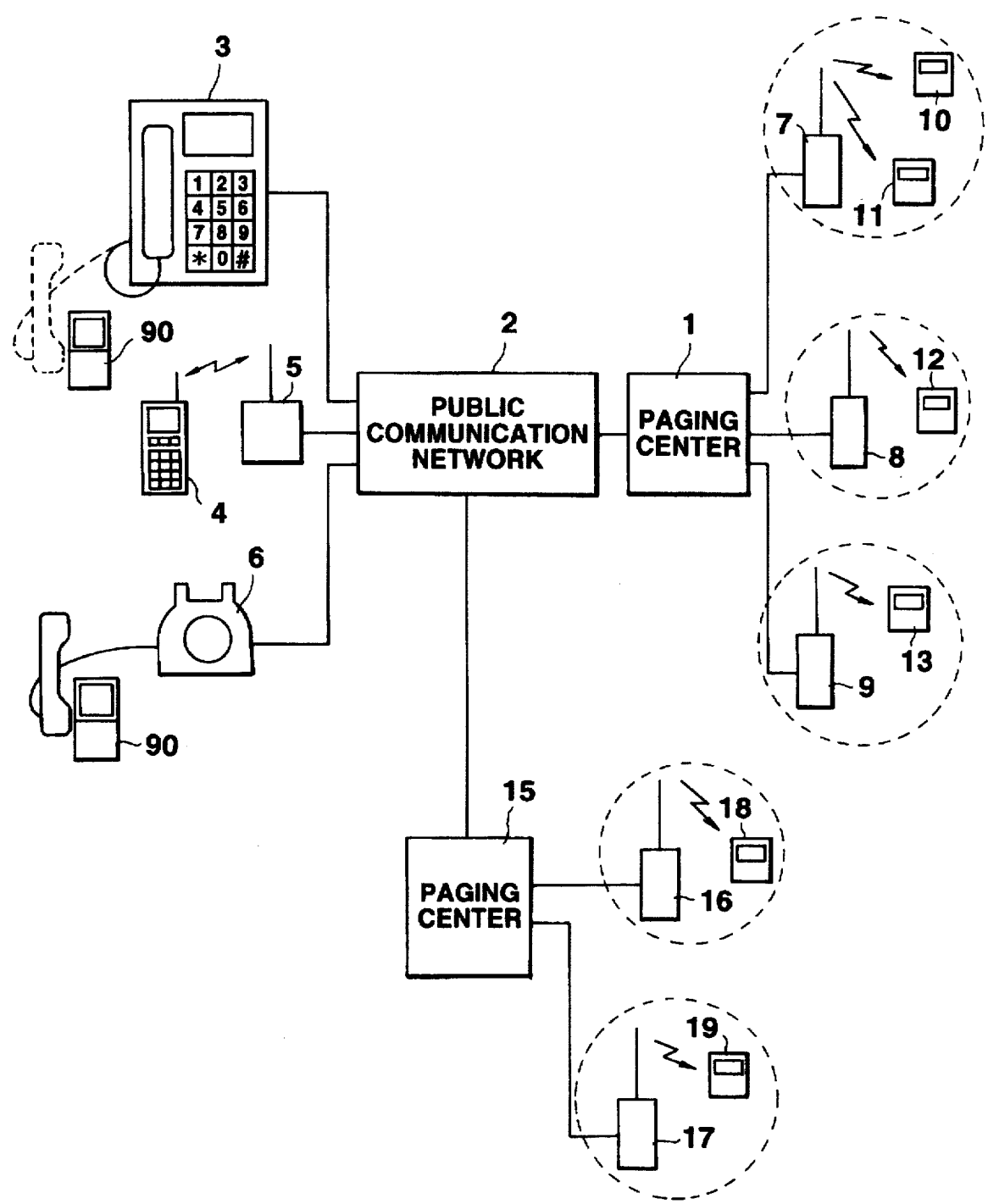
FIG. 30 is a diagram showing a schematic structure of a radio paging system according to the fourth embodiment of the present invention.

FIG. 30 shows a shematic structure of the communication system in case one radio paging service is used independently by two enterprises. The same portions as in the structure of the communication system shown in FIG. 1 have the same symbols. It is assumed that the first enterprise conducts the radio paging service using the paging center 1 and three radio base stations 7 to 9, whereas the second enterprise conducts the radio paging service having a limited amount of data different from that of the first enterprise, using the paging center 15 and two radio base stations 16 and 17. In FIG. 30, numerals 11 to 13 denote respectively paging receivers which enter the radio paging service supplied by the first enterprise; 18 and 19, paging receivers which enter the radio paging service supplied by the second enterprise; and 90, electronic device of the fourth embodiment which can be used as the message transmitter. As in the first embodiment, the electronic device 90 of the fourth embodiment will also be described as the electronic device which has both tone dialer function and pager function, and is capable of transmitting and receiving the message.

Figure 31:
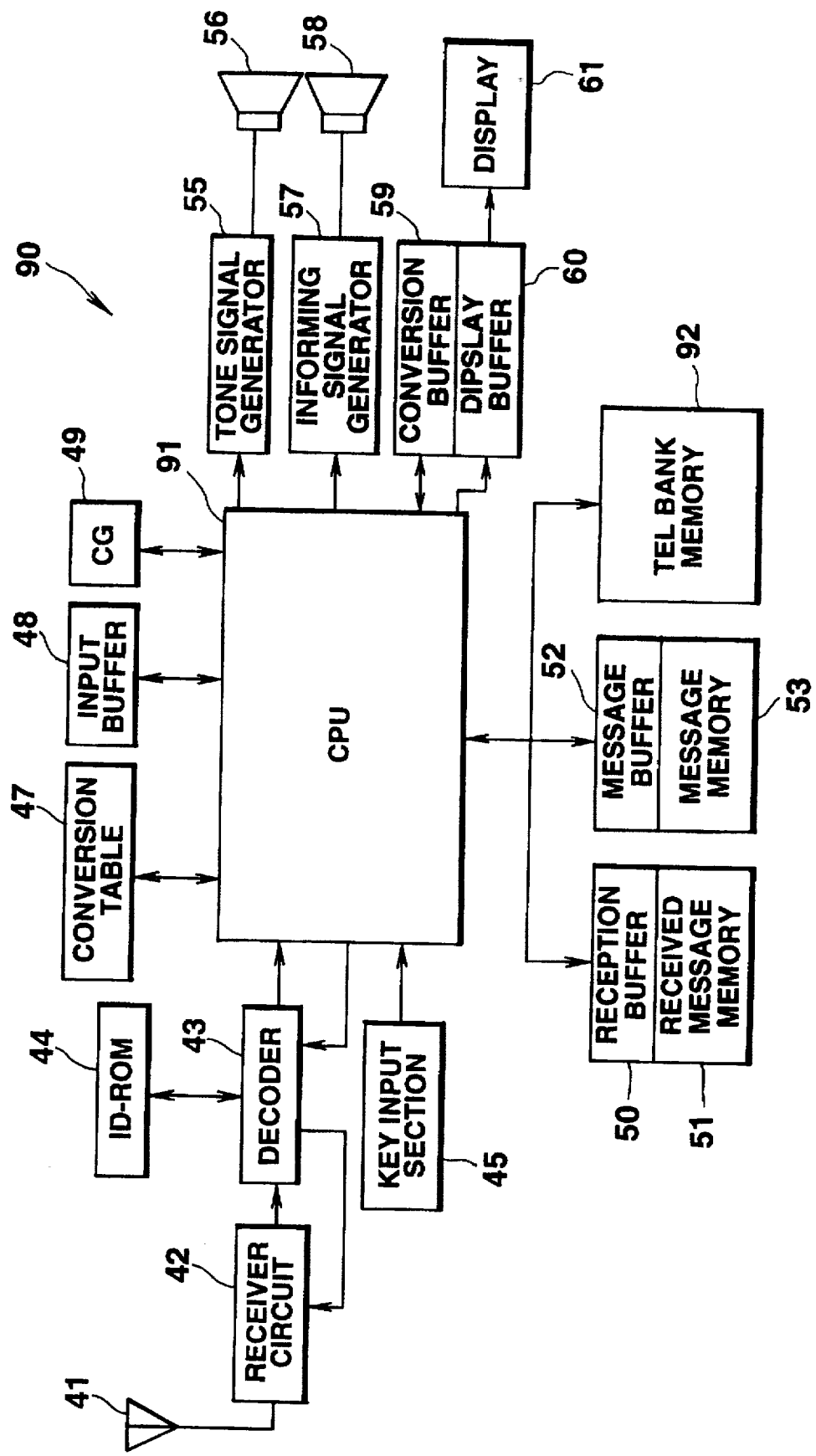
FIG. 31 is a block diagram showing a structure of the electronic device according to the fourth embodiment to which the present invention is applied.

FIG. 31 is a block construction diagram of an electronic device 90 of the fourth embodiment. In FIG. 31, a numeral 91 is a CPU which has a ROM for storing various control programs, a RAM, a timer, a register etc. therein. The ROM stores a program for executing an input process for transmission message described as a control program for the transmitting device with reference to FIG. 9, a program for executing a transmission process described later with reference to FIG. 33. The ROM stores a program for executing a reception process described with reference to FIG. 17, and a program for reading and displaying the received message stored in the received message memory as a control program for the receiver. Like the first embodiment, the RAM has timer areas for the connection timers which specifying the waiting time (for example, 5 minutes) for waiting for the reception of the message succeeding to the received message when the message having the connection code. As described in the second embodiment, the RAM has a plurality of timer areas serving as a plurality of connection timers so as to cope with a case wherein message data dividedly transmitted by a plurality of users may be received. Further, in the fourth embodiment, areas for storing the maximum amount of data transmitted by each enterprise once are formed in the RAM so that, in the process for transmitting the message described later, an amount of data which can be transmitted once is clearly shown and that a process of divided transmission can be conducted correctly, corresponding to the service of the enterprise to which the destination terminal belongs.

FIG. 32 shows a memory arrangement of the TEL bank memory 92 in the fourth embodiment. Like the TEL bank memory 54 in the first embodiment, the TEL bank memory 92 of the fourth embodiment has a plurality of bank memories, and stores telephone number, shortened No. and pager identification information indicating pager calling number. However, different pager identification information are given to every paging service enterprise whose terminal enters the service.

Other structure of the electronic device 90 of the fourth embodiment is the same as that of the electronic device 21 of the first embodiment. Therefore, the same portions are denoted by the same reference numerals and the explanation therefor is omitted. Further, since the appearance of the electronic device 90 of the second embodiment is the same as that of the electronic device 21 of the first embodiment, the external view thereof is omitted.

Figure 33:
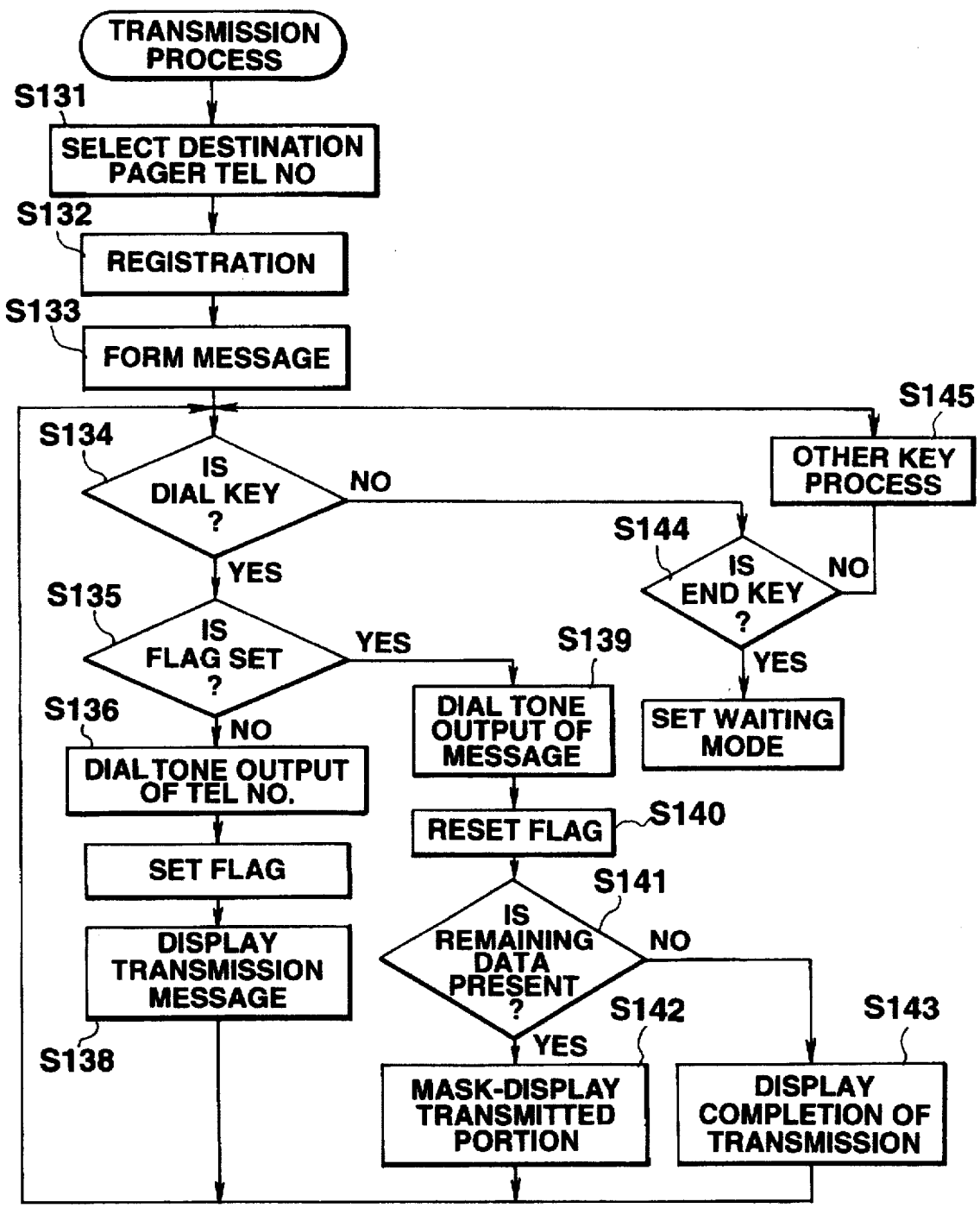
FIG. 33 is a flowchart illustrating a transmission process executed by the electronic device according to the fourth embodiment.

Next, an operation of the electronic device 90 of the fourth embodiment as the message transmitter will be described with reference to a flowchart of FIG. 33.

At first, the telephone number of the destination to which message is transmitted is selected (step S131). This selection process is effected by setting "TEL bank mode" by operating the TEL bank key 29 and then displaying the telephone number of the destination on the display 61 by operating the cursor key 36a or 36b. After the telephone number of the desired destination is displayed on the display 61, the telephone number in display is registered in the destination data storing portion 53a in the message memory 53 by operating the execution key 35 (step S132).

In the next step S133, the transmitting message is formed. This transmitting message forming process in the step S133 is substantially identical to the process described in the first embodiment with reference to FIGS. 9 and 10. However, the forming process in the fourth embodiment is different from that of the first embodiment in following two respects. First, to enter the transmitting message forming mode, the free message key 27 is operated while the telephone number of the destination is being displayed on the display 61 after the registration process of the telephone number of the destination is completed. Second, the area mask-displayed in the transmitting message forming mode is different every telephone number of the destination registered in the step S132. More particularly, such area mask-displayed can be set according to the maximum amount of data of every paging service enterprise stored in the RAM in the CPU 91, which is retrieved based on the pager identification information of the telephone number of the destination stored in the TEL bank memory 92.

In the step S133, after the input forming process for the transmission message is ended, the CPU 91 waits for the key operation such as the dial key 39, the end key etc. The processes responding to these key operations are effected in the steps S134 to S145 which are substantially the same as described with reference to FIG. 11. However, only the difference would be raised in the following. That is, in the dial tone output process of the message (step S50) in FIG. 11, the number of character converted to the dial tone is determined on the basis of the determination as to whether or not the number of remaining character to be transmitted is more than 10 characters, but, in the dial tone output process of the message (step S139) in the fourth embodiment, the number of character converted to the dial tone is determined based on the determination as to whether or not the number of remaining character to be transmitted exceeds predetermined characters corresponding to the maximum amount of data per the paging service enterprise to which the paging receiver having the telephone number registered in the step S 132 belongs. Other processes are identical to those in FIG. 11 and therefore their detailed explanations are omitted.

According to the above transmission process, upon inputting and transmitting the transmission message by the enterprise, the amount of data which can be transmitted once is clearly shown and that the process of divided transmission can be effected correctly, corresponding to the service of the enterprise to which the destination terminal belongs.

In the embodiments described above, the electronic device having the dialer function is used as the message transmitter. However, it should be noted that, in case the telephone such as the push-phone 3 connected to the public communication network 2 has the communication cable connection terminal or the optical signal input terminal for communication, the electronic device having the communication cable connection terminal or the optical signal input terminal for communication may be used. Further, the telephone such as the push-phone 3 connected to the public communication network 2 or the portable telephone 4 may be used as the message transmitter of the present invention by providing the same transmission function as the electronic device described above.

What is claimed is:

1. A method of dividedly transmitting a message data, which message data is sent in a plurality of message packets, each message packet having a predetermined format, and each message packet having a predetermined data field amount, said method comprising the steps of:

transmitting a first portion of said message data and a first code indicating that a succeeding portion of said message data is present in a first message packet, wherein the first portion and the first code are transmitted within the predetermined data field amount of the first message packet; and transmitting a subsequent portion of said message data and a second code indicating that a preceding portion is present, and also transmitting the first code if a succeeding portion is present, in a subsequent message packet;

wherein the subsequent portion, the first code, and the second code are transmitted within the predetermined data field amount of the subsequent message packet.

2. A method according to claim 1, wherein said message data includes identification information for identifying the message data.

3. A method of dividedly transmitting a message data, which message data is sent in a plurality of message packets, each message packet having a predetermined format, and each message packet having a predetermined data field amount, even if a data amount of message data exceeds an allowable amount of data, said method comprising the steps of:

displaying input message data and an indicator for indicating a range of input message data exceeding the allowable amount;

sequentially transmitting blocks of said message data, to each of which connection information indicating a connection relation between the blocks is attached, as a part of the message packet data field amount, when said input message data is in excess of said allowable amount; and sequentially displaying the blocks of said message data.

4. A method according to claim 3, wherein said connection information includes identification information for indicating a sender of the message data.

5. A method according to claim 4, wherein said connection information includes identification information which is input by the sender.

6. A method according to claim 3, wherein said connection information includes identification information for identifying the message data.

7. A method of receiving dividedly transmitted message data, which message data is sent in a plurality of message packets, each message packet having a predetermined format, and each message packet having a predetermined data field amount, comprising the steps of:

receiving blocks of the dividedly transmitted message data;

detecting connection information which is attached to each of the blocks as part of the packet data field amount and which indicates a connection relation between the blocks;

connecting the received blocks of the message data based on said connection information to reproduce the whole message data; and generating a sound indicating a completion of reception of the whole message data when a last block of the message data is received.

8. A method according to claim 7, wherein said connection information includes identification information for indicating a sender of the message data.

9. A method according to claim 7, wherein said connection information includes identification information for identifying the message data.

10. A message data transmitting apparatus for dividedly transmitting message data, which message data is sent in a plurality of message packets, each message packet having a predetermined format, and each message packet having a predetermined data field amount, even if a data amount of said message data exceeds an allowable predetermined data field amount, the apparatus comprising:

means for inputting the message data;

means for displaying the message data input by said inputting means;

means for transmitting the message data displayed on said displaying means;

display controlling means for displaying an indicator for indicating a range of displayed message data exceeding the allowable predetermined data field amount, and for controlling said displaying means so as to display sequentially blocks of the message data when the input message data exceeds said allowable predetermined data field amount; and information attaching means for attaching connection information as part of the packet data field amount, indicating a connection relation between the blocks of the message data, to the blocks of the message data as a part of the message data.

11. An apparatus according to claim 10, wherein said connection information includes identification information for indicating a sender of the message data.

12. An apparatus according to claim 11, wherein said identification information is input by the sender.

13. An apparatus according to claim 10, wherein said connection information includes identification information for identifying the message data.

14. A message data receiving apparatus for receiving dividedly transmitted message data, which message data is sent in a plurality of message packets, each messages packet having a predetermined format, and each message packet having a predetermined data field amount, the receiving apparatus comprising:

means for detecting connection information which is attached to each of blocks of the message data as part of the packet data field amount and which indicates a connection relation between the blocks, and for detecting a completion of reception of the whole message data based on said connection information;

means for generating a sound indicating a completion of reception of the whole message data based on a detection result by said detecting means;

means for connecting the blocks of the message data based on said connection information to reproduce the whole message data; and means for displaying the whole message data.

15. An apparatus according to claim 14, wherein said connection information includes identification information for identifying a sender.

16. An apparatus according to claim 14, wherein said connection information includes identification information for identifying the message data.

17. An apparatus for dividedly transmitting message data, which message data is sent in a plurality of message packets, each message packet having a predetermined format, and each message packet having a predetermined data field amount, the apparatus comprising:

means for transmitting a first portion of said message data and a first code indicating that a succeeding portion of said message data is present in a first message packet, wherein the first portion and the first code are transmitted within the predetermined data field amount of the first message packet; and means for transmitting a subsequent portion of said message data and a second code indicating that a preceding portion is present, and also transmitting the first code if a succeeding portion is present, in a subsequent message packet and wherein the subsequent portion, the first code, and the second code are transmitted within the predetermined data field amount of the subsequent message packet.

18. An apparatus according to claim 17, wherein said message data includes identification information for identifying the message data.

* * * * *